(12) United States Patent
Kim et al.

(10) Patent No.: US 12,574,860 B2
(45) Date of Patent: Mar. 10, 2026

(54) METHOD AND APPARATUS FOR COHERENT TRANSMISSION AND RECEPTION OF REFERENCE SIGNAL

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 329 days.

(21) Appl. No.: 18/139,441

(22) Filed: Apr. 26, 2023

(65) Prior Publication Data

US 2024/0089868 A1 Mar. 14, 2024

(30) Foreign Application Priority Data

| Apr. 29, 2022 | (KR) | 10-2022-0053483 |
| Jun. 15, 2022 | (KR) | 10-2022-0072981 |
| Jan. 13, 2023 | (KR) | 10-2023-0005680 |
| Mar. 29, 2023 | (KR) | 10-2023-0041430 |
| Apr. 7, 2023 | (KR) | 10-2023-0046223 |
| Apr. 25, 2023 | (KR) | 10-2023-0053777 |

(51) Int. Cl.
| H04W 52/32 | (2009.01) |
| H04W 52/24 | (2009.01) |
| H04W 52/34 | (2009.01) |

(52) U.S. Cl.
CPC ....... *H04W 52/325* (2013.01); *H04W 52/242* (2013.01); *H04W 52/346* (2013.01)

(58) Field of Classification Search
CPC ... H04L 5/0048; H04L 5/0051; H04L 5/0053; H04L 5/0094; H04L 5/0023; H04L 5/001; H04L 1/08; H04L 5/005; H04L 5/0055; H04L 5/0057; H04L 5/00; H04L 5/0005; H04L 5/0091; H04L 25/0226; H04L 25/0224; H04L 5/0035; H04L 5/0044; H04L 5/0092; H04L 1/1896;
(Continued)

(56) References Cited

U.S. PATENT DOCUMENTS

| 12,317,325 B2 * | 5/2025 | Lim | H04W 72/1268 |
| 2019/0052996 A1 | 2/2019 | Sahai et al. | |

(Continued)

FOREIGN PATENT DOCUMENTS

| WO | 2016122757 A1 | 8/2016 |
| WO | 2022010132 A1 | 1/2022 |

*Primary Examiner* — Golam Sorowar

(74) *Attorney, Agent, or Firm* — LRK PATENT LAW FIRM

(57) ABSTRACT

A method of a terminal may comprise: receiving, from a base station, configuration information of uplink reference signal (UL RS) for two or more serving cells; transmitting a first UL RS to the base station based on the configuration information in a first cell of the two or more serving cells; and transmitting a second UL RS to the base station based on the configuration information in a second cell of the two or more serving cells.

16 Claims, 13 Drawing Sheets

(58) Field of Classification Search

CPC .. H04L 5/0073; H04W 72/23; H04W 52/242; H04W 52/146; H04W 52/325; H04W 72/046; H04W 16/28; H04W 72/21; H04W 24/08; H04W 52/14; H04W 72/04; H04W 80/02; H04W 52/24; H04W 52/42; H04W 72/1268; H04W 72/12; H04W 24/10; H04W 52/32; H04W 72/0473; H04W 72/0453

See application file for complete search history.

(56) References Cited

U.S. PATENT DOCUMENTS

| | | | |
|---|---|---|---|
| 2019/0174527 A1* | 6/2019 | Park | H04L 5/0046 |
| 2019/0207731 A1* | 7/2019 | Park | H04B 7/0456 |
| 2020/0221387 A1 | 7/2020 | Kwon et al. | |
| 2020/0404593 A1 | 12/2020 | Yao et al. | |
| 2021/0022006 A1* | 1/2021 | Sun | H04W 72/23 |
| 2021/0037554 A1 | 2/2021 | Kim et al. | |
| 2021/0084625 A1 | 3/2021 | Ryu et al. | |
| 2022/0123846 A1 | 4/2022 | Chopra et al. | |
| 2022/0124636 A1* | 4/2022 | Kim | H04W 52/14 |
| 2022/0167279 A1 | 5/2022 | Zhou et al. | |
| 2023/0189250 A1* | 6/2023 | Go | H04L 5/14 |
| | | | 370/329 |
| 2023/0239113 A1* | 7/2023 | Kim | H04L 5/0091 |
| | | | 370/329 |
| 2023/0353314 A1* | 11/2023 | Kim | H04L 5/0055 |
| 2024/0155634 A1* | 5/2024 | Yuan | H04W 72/23 |
| 2024/0267181 A1* | 8/2024 | Karjalainen | H04L 5/0012 |
| 2025/0056513 A1* | 2/2025 | Kang | H04L 5/0055 |
| 2025/0097693 A1* | 3/2025 | Yuan | H04W 8/24 |

* cited by examiner

FIG. 7

Sampling rate based on the
entire carrier bandwidth
(e.g., bandwidth of carrier 1 and carrier 2)

Sampling rate based on the bandwidth of carrier 1

Sampling rate based on the bandwidth of carrier 2

METHOD AND APPARATUS FOR COHERENT TRANSMISSION AND RECEPTION OF REFERENCE SIGNAL

CROSS-REFERENCE TO RELATED APPLICATIONS

This application claims priority to Korean Patent Applications No. 10-2022-0053483, filed on Apr. 29, 2022, No. 10-2022-0072981, filed on Jun. 15, 2022, No. 10-2023-0005680, filed on Jan. 13, 2023, No. 10-2023-0041430, filed on Mar. 29, 2023, No. 10-2023-0046223, filed on Apr. 7, 2023, and No. 10-2023-0053777, filed on Apr. 25, 2023, with the Korean Intellectual Property Office (KIPO), the entire contents of which are hereby incorporated by reference.

BACKGROUND

1. Technical Field

Exemplary embodiments of the present disclosure relate to a communication technique, and more specifically, to a technique for coherent transmission and reception of reference signals.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, in a communication system, a wideband reference signal (RS) may be transmitted. For example, a base station may transmit a wideband DL RS, and a terminal may transmit a wideband UL RS. To improve performance of the communication system, it may be necessary to ensure coherence for the wideband RS.

SUMMARY

Exemplary embodiments of the present disclosure are directed to providing a method and an apparatus for coherent transmission and reception of reference signals in a communication system.

A method of a terminal, according to a first exemplary embodiment of the present disclosure for achieving the above-described objective, may comprise: receiving, from a base station, configuration information of uplink reference signal (UL RS) for two or more serving cells; transmitting a first UL RS to the base station based on the configuration information in a first cell of the two or more serving cells; and transmitting a second UL RS to the base station based on the configuration information in a second cell of the two or more serving cells.

The first UL RS and the second UL RS may be transmitted in a same time, and the first UL RS and the second UL RS may be mapped at a same interval in a frequency region excluding a guard band.

A state of the first cell and a state of the second cell may be a same state, and the same state may be an activated state or a deactivated state.

A first energy per resource element (EPRE) for the first UL RS transmitted in the first cell may be identical to a second EPRE for the second UL RS transmitted in the second cell.

A maximum number of transmission combs may be same in all bandwidth parts (BWPs) belonging to the two or more serving cells, and the transmission comb may be applied to transmission of each of the first UL RS and the second UL RS.

The method may further comprise: receiving, from the base station, a power control parameter set, wherein the first UL RS and the second UL RS may be transmitted based on the power control parameter set.

The method may further comprise: receiving a pathloss (PL) RS indicated by the power control parameter set; measuring a path loss based on the PL RS; and deriving a transmit (Tx) power based on the path loss, wherein the Tx power is used for transmission of the first UL RS and the second UL RS.

The Tx power in each of the two or more serving cells may be derived based on the power control parameter set, and the derived Tx power may not exceed both a maximum power of the terminal and a maximum power allowed in each of the two or more serving cells.

The method may further comprise: receiving one or more downlink (DL) RSs in the two or more serving cells; and determining a Tx beam based on the one or more DL RSs, wherein the determined Tx beam is used for transmission of the first UL RS and the second UL RS.

A first Tx beam may be determined based on a first DL RS received in the first serving cell among the one or more DL RSs, the first Tx beam may be used for transmission of the first UL RS, a second Tx beam may be determined based on a second DL RS received in the second serving cell among the one or more DL RS s, the second Tx beam may be used for transmission of the second UL RS, and the first Tx beam and the second Tx beam may be independently determined.

When transmission of at least one of the first UL RS or the second UL RS collides with another signal or channel transmission, a part of the transmission of at least one of the first UL RS or the second UL RS may be canceled in units of symbols in an entire band.

A terminal, according to a second exemplary embodiment of the present disclosure for achieving the above-described objective, may comprise a processor, and the processor may cause the terminal to perform: receiving, from a base station, configuration information of uplink reference signal (UL RS) for two or more serving cells; transmitting a first UL RS to the base station based on the configuration information in a first cell of the two or more serving cells; and transmitting a second UL RS to the base station based on the configuration information in a second cell of the two or more serving cells, wherein the first UL RS and the second UL RS are transmitted in a same time.

A state of the first cell and a state of the second cell may be a same state, and the same state may be an activated state or a deactivated state.

A first energy per resource element (EPRE) for the first UL RS transmitted in the first cell may be identical to a second EPRE for the second UL RS transmitted in the second cell.

A maximum number of transmission combs may be same in all bandwidth parts (BWPs) belonging to the two or more serving cells, and the transmission comb may be applied to transmission of each of the first UL RS and the second UL RS.

The processor may further cause the terminal to perform: receiving, from the base station, a power control parameter set, wherein the first UL RS and the second UL RS may be transmitted based on the power control parameter set.

The processor may further cause the terminal to perform: receiving a pathloss (PL) RS indicated by the power control parameter set; measuring a path loss based on the PL RS; and deriving a transmit (Tx) power based on the path loss, wherein the Tx power is used for transmission of the first UL RS and the second UL RS.

The Tx power in each of the two or more serving cells may be derived based on the power control parameter set, and the derived Tx power may not exceed both a maximum power of the terminal and a maximum power allowed in each of the two or more serving cells.

The processor may further cause the terminal to perform: receiving one or more downlink (DL) RSs in the two or more serving cells; and determining a Tx beam based on the one or more DL RSs, wherein the determined Tx beam is used for transmission of the first UL RS and the second UL RS.

When transmission of at least one of the first UL RS or the second UL RS collides with another signal or channel transmission, a part of the transmission of at least one of the first UL RS or the second UL RS may be canceled in units of symbols in an entire band.

According to the present disclosure, a terminal may transmit uplink reference signals (UL RSs) in two or more serving cells. An energy per resource element (EPRE) for the UL RSs in the two or more serving cells may be constant, and a transmit (Tx) power of the UL RS in each serving cell may not exceed the maximum power. The Tx power of the UL RS in each serving cell may be derived based on a path loss. Accordingly, coherent transmission and reception operations for the UL RS can be guaranteed. In addition, coherent transmission and reception operations for downlink (DL) RSs may also be guaranteed based on the same or similar schemes as those of the UL RSs.

BRIEF DESCRIPTION OF DRAWINGS

FIG. 7 is a conceptual diagram illustrating a second exemplary embodiment of a RE mapping method for RS.

DETAILED DESCRIPTION OF THE EMBODIMENTS

Figure 1:
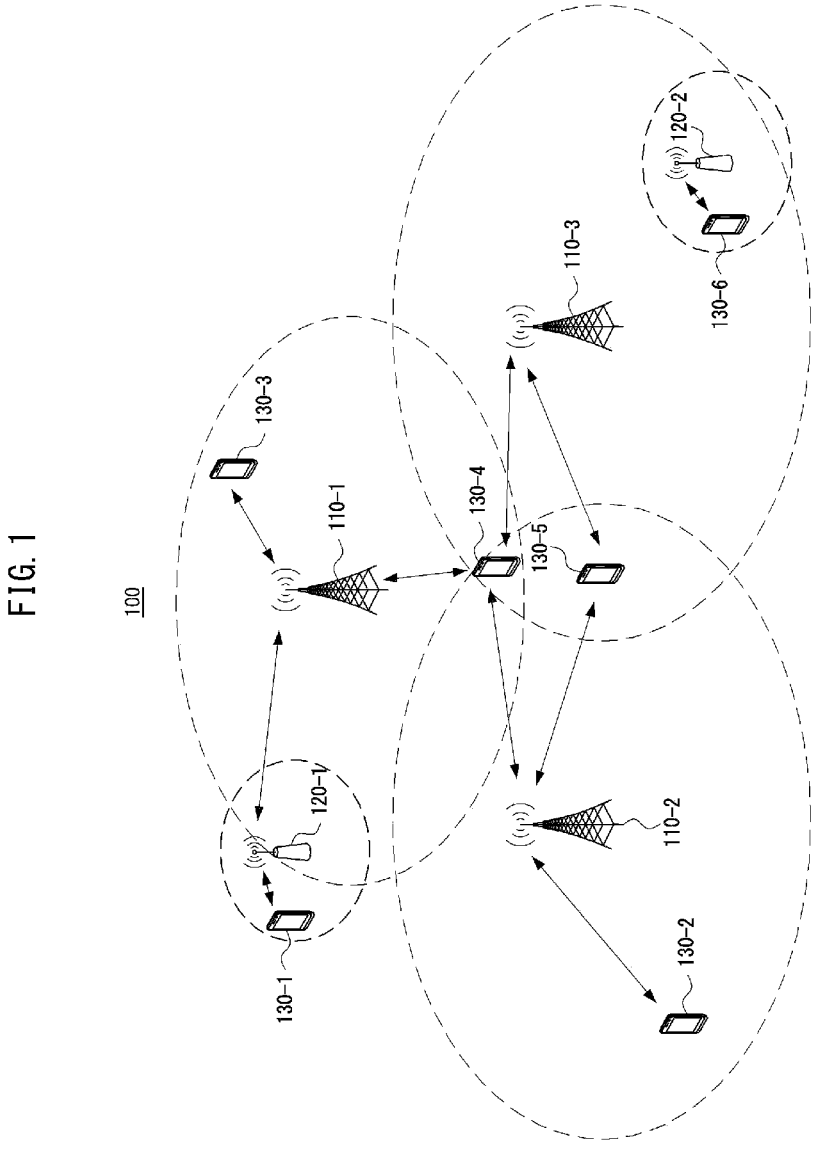
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
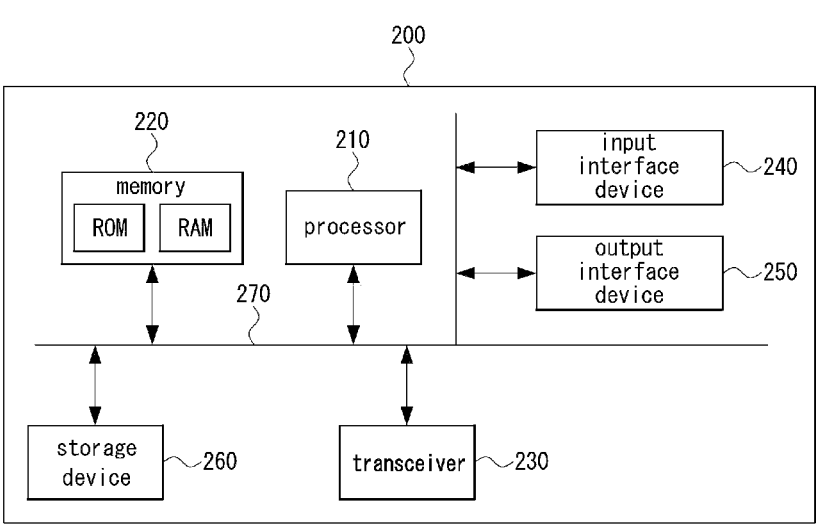
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MEMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

Chapter 1 Introduction

Scenarios to which communication is applied may be an Enhanced Mobile BroadBand (eMBB) scenario, a Massive Machine-Type Communication (mMTC) scenario, an Ultra-Reliable and Low-Latency Communication (URLLC) scenario, and/or Time Sensitive Communication (TSC) scenario. The mMTC scenario, URLLC scenario, and/or TSC scenario may be applied in Internet of Things (IoT) communication. One communication network (e.g., one communication system) may support all of the scenarios described above or some of the scenarios described above. In a communication network supporting the mMTC scenario, IMT-2020 requirements can be satisfied by using narrowband (NB)-IoT and LTE-MTC. A lot of discussion may be needed to satisfy the requirements in a communication system that supports the URLLC scenario.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic, a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or a DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG). In the present disclosure, the number of repetitions may refer to the number of repeated transmissions or the number of transmissions.

In order to support URLLC traffic, it may be preferable for the terminal to perform frequent reception operations in downlink (DL) resources and/or frequent transmission operations in uplink (UL) resources. In a time division duplex (TDD) system, the terminal may operate based on a half-duplex scheme. Accordingly, a time of supporting DL traffic and/or UL traffic may increase according to a slot pattern. On the other hand, in a frequency division duplex (FDD) system, the terminal may utilize DL resources and UL resources at the same time. Accordingly, the above-described problem in the TDD system may not occur in the FDD system. The FDD system may use two or more carriers. When two or more serving cells are configured to the terminal in the TDD system, the terminal may utilize DL resources and UL resources.

In a communication system including at least one carrier to which FDD is applied (hereinafter referred to as 'FDD carrier'), there may be no problem regarding a delay time of the terminal. In a communication system including only carrier(s) to which TDD is applied (hereinafter, referred to as 'TDD carrier(s)'), a problem regarding a delay time of the terminal may exist. In order to solve the above-described problem, slots in the TDD carriers may be configured according to different patterns.

Carrier aggregation (CA) may be configured in the terminal, and a PCell and SCell(s) may be activated. Depending on whether a common search space (CSS) set is included, a cell may be classified into a PCell or an SCell. For example, the PCell may include a CSS set, and the SCell may not include a CSS set. In order to reduce a latency in a communication system supporting URLLC traffic, slots having different patterns may be configured and/or indicated to the terminal.

A terminal receiving a positioning reference signal (PRS) may establish an RRC connection with a base station. Alternatively, the RRC connection of the terminal may be deactivated. TRPS transmitting PRSs may belong to different serving cells (e.g., different base stations). To reflect the above-described operation, a frequency resource in which the PRS is received may be referred to as a positioning frequency layer (PFL). The base station may configure and/or indicate the PFL to the terminal. The terminal may identify the PFL based on the configuration and/or indication of the base station. The PFL may be configured and/or indicated independently of a bandwidth part (BWP).

Chapter 2 Reference Signal for Coherent Transmission and Reception in the Frequency Domain 2.1 Exemplary Embodiments for Coherent Transmission and Reception of RS A processing operation on signals received in a same time (e.g., time period) may be performed for each sub-band. A reference time of a Tx processing operation may be different for each sub-band. In this case, a phase of a wideband signal may vary for each sub-band. This is because different active filters are applied for the respective sub-bands to secure a band gap. The wideband signal may refer to a signal transmitted in a wideband. When a passive filter is used, a phase variation of the wideband signal may be compensated for in an equalization operation such as Rx channel estimation. A direct function or an indirect function of a memory may be utilized for the active filter, and the memory's own power may be consumed. For example, the active filter may refer to a discrete Fourier transform (DFT), inverse DFT (IDFT), oversampling, digital-to-analog (D/A) converter, circulator, and/or the like.

A bandpass filter in a Tx processing chain or an Rx processing chain may be emphasized. A separate processing operation may not be performed for each sub-band or carrier. A unified processing operation may be performed in sub-bands or carriers. A result of the unified processing operation may be converted for each sub-band or carrier, and a transmission step or reception step may be emphasized.

Signals may be processed in contiguous frequency resources within the same sub-band, the same serving cell, or the same carrier. If selectivity of a radio channel is not considered, signals may be expressed as having a phase coherence. In order to secure a band gap (or guard band), an additional filtering operation may be performed. In this case, it may be difficult to guarantee the phase coherence.

Figure 3:
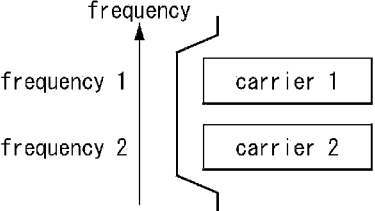
FIG. 3 is a conceptual diagram illustrating a first exemplary embodiment of a wideband filtering method for RSs received in two or more carriers.

FIG. 3 is a conceptual diagram illustrating a first exemplary embodiment of a wideband filtering method for RSs received in two or more carriers.

Referring to FIG. 3, RSs may be received in two or more carriers, and a wideband filtering operation may be applied to the RSs. The two or more carriers may include a carrier 1 and a carrier 2. FIG. 3 shows a frequency response when the wideband filtering operation is applied. A bandpass filter may have a frequency response that includes the carrier 1, the carrier 2, and a guard band therebetween. A signal received by the terminal may be expressed as y(t). A multi-carrier demodulation operation may be performed on y(t). Unnecessary components (e.g., signal belonging to the guard band) in y(t) may be removed in an operation subsequent to the multi-carrier demodulation operation. Coherence for signals corresponding to the respective carriers may be considered to be maintained.

Figure 4:
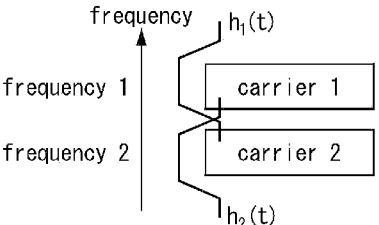
FIG. 4 is a conceptual diagram illustrating a first exemplary embodiment of a narrowband filtering method for RSs received in two or more carriers.

FIG. 4 is a conceptual diagram illustrating a first exemplary embodiment of a narrowband filtering method for RSs received in two or more carriers.

Referring to FIG. 4, RSs may be received in two or more carriers, and a narrowband filtering operation may be applied to the RSs. The two or more carriers may include a carrier 1 and a carrier 2. FIG. 4 shows a frequency response when the narrowband filtering operation is applied. A bandpass filter 1 and a bandpass filter 2 may operate based on the same time synchronization. $h_1(t)$ may represent an impulse response of the bandpass filter 1. $h_2(t)$ may represent an impulse response of the bandpass filter 2.

A signal received by the terminal may be expressed as y(t). The terminal may derive $y_1(t)$ and $y_2(t)$ based on y(t). A multi-carrier demodulation operation may be performed on $y_1(t)$ and $y_2(t)$. Since a coherence for $h_1(t)$ and $h_2(t)$ is maintained, it may be considered that the coherence is also maintained for $y_1(t)$ and $y_2(t)$.

The above-described operations may be equally or similarly applied to uplink (UL) RSs. A signal to be transmitted by the terminal may pass through bandpass filters, and the bandpass filters may operate based on the same time synchronization. Therefore, the coherence for $y_1(t)$ and $y_2(t)$ may be considered to be maintained.

Alternatively, the bandpass filter 1 may be applied to a frequency layer 1 and the bandpass filter 2 may be applied to a frequency layer 2. The time synchronization of the bandpass filter 1 may be different from that of the bandpass filter 2. A difference between the time synchronization of the bandpass filter 1 and the time synchronization of the bandpass filter 2 may not be known, and the difference therebetween may not be cancelled out. Accordingly, it may be difficult to perform a coherent combining operation on a DL RS 1 (e.g., $y_1(t)$) and a DL RS 2 (e.g., $y_2(0)$) received by the terminal.

When the above-described method is applied, the terminal may apply the bandpass filter 1 and the bandpass filter 2, respectively, to perform RS reception operations or RS transmission operations in two serving cells. In the DL RS transmission/reception operation, the base station may transmit the DL RS (e.g., $y(t)$). The terminal may estimate $y_1(t)$ receivable in the frequency layer 1 by applying the bandpass filter 1, and may estimate $y_2(t)$ receivable in the frequency layer 2 by applying the bandpass filter 2. For coherent reception, the terminal may interpret a combination of $y_1(t)$ and $y_2(t)$ as a wideband signal. Accordingly, the terminal may maintain a phase continuity of the signals received through the bandpass filter 1 and the bandpass filter 2.

In the UL RS transmission/reception operation, the terminal may transmit the UL RS (e.g., $y(t)$). $y(t)$ may pass through bandpass filters of the base station. The base station may obtain $y_1(t)$ and $y_2(t)$, which are outputs of the bandpass filters. For coherent reception, the base station may interpret a combination of $y_1(t)$ and $y_2(t)$ as a wideband signal.

According to a proposed method, a reference time during which a polarization of the DL RS is maintained may be defined, and within the reference time, narrowband parts of the DL RS may be received at different times (e.g., in different symbols), but the DL RS may be interpreted as a wideband DL RS. In other words, the DL RSs received at different times may be interpreted as a wideband DL RS. The reference time may be determined according to a capability of the terminal. Frequency hopping for the DL RS may be applied, and a coherent reception operation for the DL RS may be performed.

When the frequency hopping is allowed, power densities for a frequency hop 1 and a frequency hop 2 of the DL RS may be changed. Accordingly, the coherence may not be maintained.

One power amplifier of the terminal may operate in two or more carriers. When a separate power amplifier is allocated for each carrier, it may be difficult to maintain the phase coherence.

When DL RSs are transmitted in two or more carriers (or PFLs) and a phase coherence for the DL RSs is not maintained, the terminal may not be able to derive (or calculate) measurement values derived using the DL RSs for the respective PFLs as one measurement value. When the phase coherence is maintained, the terminal may derive (or calculate) measurement values derived using the DL RSs for the respective PFLs as one measurement value. The above-described operation may be equally or similarly applied to UL RSs. When DL RSs received in two PFLs are considered and a part of the DL RS belonging to each PFL is referred to as a DL RS 1 and a DL RS 2, a phase continuity for the DL RS 1 and the DL RS 2 may be secured at the base station. The terminal may derive a measurement value 1 in a reception procedure of the DL RS 1 and may derive a measurement value 2 in a reception procedure of the DL RS 2. Since the phase continuity is maintained, the terminal may derive a measurement value 3 by combining the measurement value 1 and the measurement value 2. The terminal may derive a difference (e.g., relative difference) between an estimation accuracy of the measurement value 1 and an estimation accuracy of the measurement value 2 based on the phase continuity. Accordingly, the terminal may identify weights for combining the measurement value 1 and the measurement value 2. The estimation accuracy may refer to an accuracy of an estimator.

The measurement value may be a time of arrival (ToA). The terminal may derive a ToA 1 based on the DL RS 1 and may derive a ToA 2 based on the DL RS 2. The DL RS 1 and the DL RS 2 may not be independently received, and a phase continuity may be maintained between the DL RS 1 and the DL RS 2. Accordingly, the DL RS 1 and the DL RS 2 may be interpreted as parts of the same DL RS. The terminal may derive a ToA 3 from the ToA 1 and the ToA 2. The terminal may apply a weighted average of the ToA 1 and the ToA 2 in consideration of the estimation accuracies of the ToA 1 and the ToA 2. The terminal may derive the ToA 3 by applying the weighted average of the ToA 1 and ToA 2. The terminal may estimate a ToA by directly processing the DL RS, and a ToA 4 may be obtained based on the estimation of the ToA. Since the phase continuity is guaranteed at the base station, the ToA 3 and the ToA 4 may be regarded as not being significantly different.

If the phase continuity is not guaranteed at the base station, the ToA 1 and the ToA 2 derived by the terminal may be interpreted as independent observations. Therefore, a basis for deriving the ToA 3 may not exist. When the terminal derives one measurement value, a ToA 3' may be defined as an arithmetic average of the ToA 1 and the ToA 2. Since prior knowledge is not utilized, an estimation accuracy for the ToA 3' may be low. Therefore, the ToA 3' and the ToA 4 may be significantly different.

The guarantee of phase continuity may refer to that time synchronization and/or frequency synchronization are maintained below a specific condition. The specific condition may be defined in technical specifications.

The terminal may derive measurement value(s) based on DL RS(s) received through two or more PFLs. The above-described operation may satisfy a specific condition. For example, when DL RS resources are associated with different PFLs, the number of physical resource blocks (PRBs) in each of the DL RS resources may be different, and numerologies in the PFLs may be the same. 'DL RS resources are associated with different PFLs' may mean that the DL RSs are received in different PFLs. The measurement values of DL RSs received in different PFLs may be derived based on the same antenna reference point of the same TRP. The DL RSs for different PFLs may be received in the same symbol of the same slot in the time domain. In other words, the DL RS resources associated with different PFLs may be located in the same symbol of the same slot. The PFLs may be consecutively arranged in the frequency domain and may belong to the same frequency band. The PFLs may be intra-band contiguous PFLs.

The UL RS s may be transmitted in different carriers. In this case, carriers for the UL RSs may be consecutively arranged in the frequency domain and may belong to the same frequency band. The carriers may be intra-band contiguous carriers. The UL RSs may be transmitted in the same symbol of the same slot. In other words, the UL RS resources may be located in the same symbol of the same slot. For example, when different UL RSs are transmitted in different carriers, the number of PRBs in different carriers may be different, and numerologies for the UL RSs in different carriers may be the same.

2.2 RS Configuration Method

The terminal may receive a DL RS belonging to a frequency layer. One frequency layer may correspond to one carrier or one serving cell. Alternatively, one frequency layer may correspond to two or more carriers or two or more serving cells. The base station may configure or indicate to the terminal two or more frequency layers through which the DL RS is received. In other words, DL RS configuration information may be transmitted to the terminal. The terminal may receive the DL RS configuration information from the base station. In addition, the base station may configure or indicate to the terminal two or more frequency layers through which the UL RS is transmitted. In other words, UL RS configuration information may be transmitted to the terminal. The terminal may receive the UL RS configuration information from the base station.

Method 2.2-1: The DL RS configuration information may include information indicating two or more DL RS resources, and a DL RS for each of the two or more DL RS resources may be received in each carrier or each serving cell. The UL RS configuration information may include information indicating two or more UL RS resources, and a UL RS for each of the two or more UL RS resources may be received in each carrier or each serving cell.

The serving cell(s) or carrier(s) through which the DL RS is received may be in the same state (e.g., activated state or deactivated state), and the serving cell(s) or carrier(s) through which the UL RS is transmitted may be in the same state. For example, a state of a first serving cell through which a first DL RS is received may be the same as a state of a second serving cell through which a second DL RS is received. A state of a first serving cell through which a first UL RS is transmitted may be the same as a state of a second serving cell through which a second UL RS is transmitted. Serving cell(s) or carrier(s) associated with a PRS may be in the same state. When an RRC connection of the terminal is established (e.g., when the terminal is in an RRC connected state), all of the serving cell(s) through which the PRS is transmitted and received may be activated or deactivated. When the RRC connection of the terminal is maintained in an inactive state (e.g., when the terminal is in an RRC inactive state), all of the serving cell(s) through which the PRS is transmitted and received may be activated or deactivated.

Method 2.2-2: All of the serving cell(s) associated with PRS transmission/reception may be activated or deactivated.

The terminal may transmit UL RSs in two or more serving cells or two or more carriers. The UL RSs in two or more serving cells or two or more carriers may be transmitted at the same time or at different times. The UL RSs in two or more serving cells or two or more carriers may be a wideband UL RS. The serving cell(s) or carrier(s) through which the UL RS is transmitted may be in the same state (e.g., activated state or deactivated state). When the RRC connection of the terminal is established (e.g., when the terminal is in the RRC connected state), all of the serving cell(s) through which the UL RS is transmitted and received may be activated or deactivated. When the RRC connection of the terminal is maintained in the inactive state (e.g., when the terminal is in the RRC inactive state), all of the serving cell(s) through which UL RS is transmitted and received may be activated or deactivated.

Method 2.2-3: All of the serving cell(s) associated with UL RS transmission and reception may be activated or deactivated.

For example, when the UL RS is an SRS, the SRS may not be transmitted in deactivated serving cell(s). According to technical specifications, the SRS may be transmitted only in a UL BWP of an activated serving cell. According to another proposed method, even when some serving cells are deactivated, the terminal may assume an initial UL BWP. Therefore, the terminal may transmit the UL RS in several serving cells. The UL RS may be transmitted in a UL BWP of an activated serving cell and a UL BWP of a deactivated serving cell.

The UL RS may be transmitted in a specific BWP (e.g., active BWP) of a serving cell. The BWP through which the UL RS is transmitted may not be limited to the specific BWP. For example, the UL RS may be transmitted in a BWP belonging to two or more serving cells. The BWP may belong to each of the serving cells, and the BWPs of the serving cells may be aggregated. The aggregated BWPs may be utilized for transmission and reception of UL RS. Alternatively, one BWP may have a bandwidth including two or more serving cells, and transmission of the UL RS may be performed in one BWP.

Method 2.2-4: A UL BWP through which a UL RS is transmitted may include two or more carriers.

In another proposed method, the base station may configure or indicate a UL BWP of each of two or more carriers to the terminal. In other words, the base station may transmit UL BWP configuration information to the terminal in two or more carriers, and the terminal may receive the UL BWP configuration information from the base station. In this case, the terminal may apply configuration parameter(s) indicated in one BWP (e.g., one UL BWP). Alternatively, the terminal may apply one reference parameter derived by itself. For example, the configuration parameter (or reference parameter) may be a numerology and/or time-synchronization.

Method 2.2-5: A UL BWP through which a UL RS is transmitted may be indicated for each carrier, and one time synchronization and/or one numerology may be applied to UL BWPs.

Method 2.2-6: An UL RS configuration information may include information indicating two or more UL RS resources, and a UL RS for each of the UL RS resources may be transmitted in each carrier or each serving cell.

When the UL RS is transmitted in two or more serving cells or two or more carriers, a BWP considered in each serving cell (or each carrier) may be an active BWP or an initial BWP. The UL RS (or sounding reference signal (SRS) for positioning) may be included in the BWP configuration (e.g., BWP configuration information). Accordingly, the UL RS that the terminal intends to transmit may be configured to have a valid resource for each serving cell.

The UL RS configuration information may be included in UL BWP configuration (e.g., UL BWP configuration information) of one serving cell. When the UL RS is transmitted in two or more serving cells, the UL RS configuration information may include at least one of index(es) of serving cell(s), identifier(s) of UL BWP(s), or index(es) of UL RS resource(s) of the serving cell(s). A serving cell index list, UL BWP identifier list, and/or UL RS resource index list may be included in the UL RS configuration information. In the present disclosure, a list may include a plurality of indexes, and an index may mean an identifier.

The terminal may transmit a first UL RS in a first cell and transmit a second UL RS in a second cell. The first UL RS and the second UL RS may be transmitted at the same time, and the first UL RS and the second UL RS may be mapped at the same interval in the frequency domain. The first UL RS and the second UL RS may be mapped at the same interval in the frequency domain excluding the guard band.

Each of all BWPs of the serving cell may be an active BWP, initial BWP, or default BWP. Considering the DL RS, DL RS configuration information managed by an LTE positioning protocol (LPP) may be configured or indicated to the terminal. The terminal may receive the DL RS configuration information from the base station. Therefore, the terminal may receive the DL RS regardless of the DL BWP. Since UL RS configuration information managed by an RRC layer is configured or indicated to the terminal, the UL RS may have a close relationship with the UL BWP. In other words, the terminal cannot transmit the UL RS regardless of the UL BWP.

Method 2.2-7: All BWPs associated with DL RS or UL RS transmission and reception may be active BWPs, initial BWPs, or default BWPs.

When the UL RS is configured as an SRS-pos, two or more SRS-pos resources may belong to the same SRS resource set. The SRS-pos may be an SRS for positioning. Identifier(s) (or index(es)) of two or more SRS-pos resources may be applied in one UL RS. Here, when an SRS or SRS resource is used for positioning, the SRS may refer to as SRS-pos, and the SRS resource may refer to an SRS-pos resource.

The base station may transmit an activation indication for UL RS transmission to the terminal using RRC signaling and/or MAC CE. The terminal may receive the activation indication for UL RS transmission from the base station. The activation indication for UL RS transmission may indicate activation of UL RS transmission and/or activation of a UL BWP associated with the UL RS transmission. The terminal may transmit the UL RS until receiving a release message and/or a deactivation indication. The UL RS may be transmitted periodically.

Activation or deactivation of semi-persistent SRS-pos transmission may be indicated by a MAC CE. The MAC CE may include an information element (e.g., field) indicating activation or deactivation of an SRS resource set (e.g., SRS-pos resource set). SRS resources belonging to the SRS resource set may all belong to the same BWP. All SRS resources may be activated or deactivated by the MAC CE. The SRS resources may have independent spatial relations. A method for the SRS resources to have a common spatial relation (e.g., a method for setting an appropriate transmission configuration indication (TCI) state) will be described later.

UL RS transmission may be triggered using DCI. In at least one trigger state, the terminal may transmit the UL RS (e.g., SRS-pos) in two or more carriers or two or more serving cells. In other words, UL RS resource(s) (e.g., SRS-pos resource(s)) may be configured in two or more carriers or two or more serving cells.

2.2.1 Resource Element (RE) Mapping

The terminal may perform measurements on a DL RS in a slot or symbol belonging to a measurement gap. Alternatively, when a measurement gap is not configured, the terminal may perform the DL RS measurement in a time resource in which a DL RS resource is configured. The DL RS indicated to the terminal may be received in one or more frequency layers. The frequency layer may correspond to one serving cell or one carrier. Alternatively, one frequency layer may correspond to a plurality of serving cells or a plurality of carriers.

The terminal may perform a radio resource management (RRM) operation on DL RS(s) received in a plurality of frequency layers, and may obtain one value as a result of the RRM operation. The RRM operation may include a ToA measurement operation, a reference signal time different (RSTD) measurement operation, and/or a Tx-Rx time difference measurement operation. The Tx-Rx time difference may mean an Rx-Tx time difference, and a time difference may mean a timing difference.

The terminal may perform an RRM operation on DL RS(s) received in a plurality of frequency layers, and may obtain one value as a result of the RRM operation.

The base station may configure a measurement gap to the terminal, and the measurement gap may be applied periodically. The terminal may identify the measurement gap configured by the base station. The terminal may perform an RRM operation on a signal including a DL RS in the measurement gap. Scheduling information of the base station may not be received in the measurement gap. UL transmission (e.g., physical uplink control channel (PUCCH) transmission, PUSCH transmission) of the terminal may not be performed in the measurement gap.

The terminal may transmit UL RS(s) in one or more serving cells. The UL RS may be an SRS. In other words, the UL RS may be transmitted in an SRS resource. Accordingly, the frequency layer or measurement gap may not be configured or indicated to the terminal.

Figure 5:
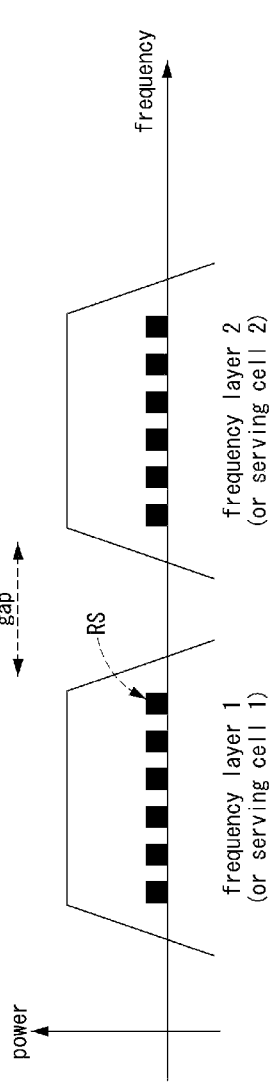
FIG. 5 is a conceptual diagram illustrating a first exemplary embodiment of a DL RS or UL RS mapping method.

FIG. 5 is a conceptual diagram illustrating a first exemplary embodiment of a DL RS or UL RS mapping method.

Referring to FIG. 5, the terminal may receive DL RSs in two carriers. The terminal may transmit UL RSs in two carriers. The DL RSs and/or UL RSs may be mapped to two carriers. A frequency gap may exist between the carriers. Interference between the carriers may be processed by bandpass filtering. The DL RS and/or UL RS may be mapped to a plurality of carriers and may not be mapped to a gap between the plurality of carriers.

RS sequences and RE mappings may be distinguished from each other. RS sequences may be generated, and one or more sequence indexes (e.g., one or more RS sequence indexes) may correspond to one or more modulation symbols according to a modulation order, and one modulation symbol corresponds to one RE.

The frequency gap may be excluded from REs to which the RS is mapped. RE mapping considering the above-described situation may be required.

Figure 6:
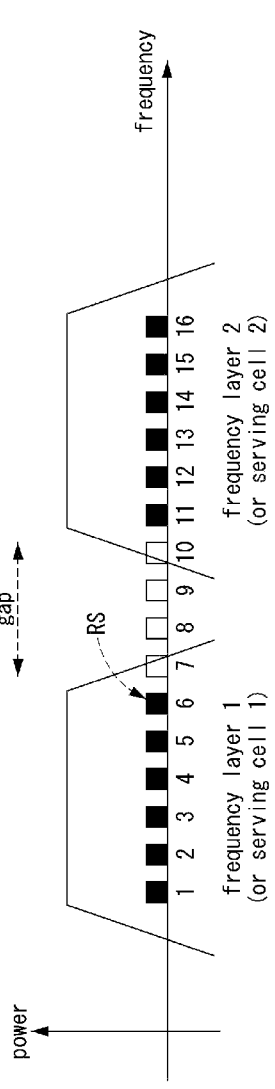
FIG. 6 is a conceptual diagram illustrating a first exemplary embodiment of a RE mapping method for RS.
Figure 7:
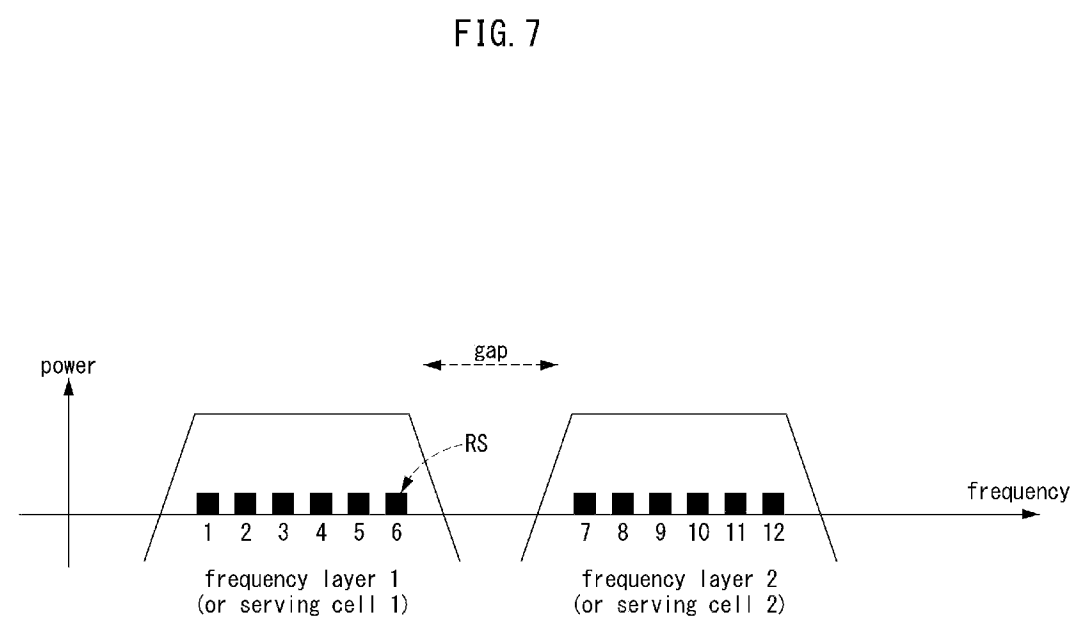
Figure 8:
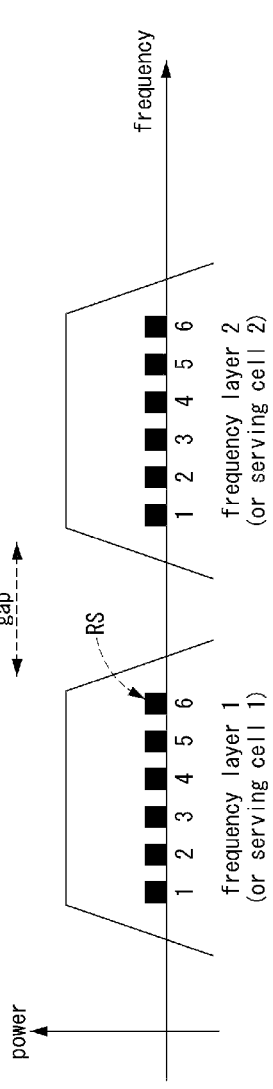
FIG. 8 is a conceptual diagram illustrating a third exemplary embodiment of a RE mapping method for RS.

FIG. 6 is a conceptual diagram illustrating a first exemplary embodiment of a RE mapping method for RS, FIG. 7 is a conceptual diagram illustrating a second exemplary embodiment of a RE mapping method for RS, and FIG. 8 is a conceptual diagram illustrating a third exemplary embodiment of a RE mapping method for RS.

Referring to FIG. 6, an RS sequence may be mapped to REs (e.g., all REs), and valid RE(s) among the REs to which the RS sequence is mapped may be selected. The RS sequence may be mapped to RE(s) belonging to a carrier gap. Accordingly, the indexes of the RS sequences may be continuous in a frequency region including the carriers and the carrier gaps. The RS sequence may not be transmitted in RE(s) belonging to the carrier gap.

Referring to FIG. 7, valid RE(s) may be selected, and the RS sequence may be mapped to the valid RE(s). The RS sequence may not be mapped to REs belonging to the carrier gap. Therefore, the index of the RS sequence may not be set in REs belonging to the carrier gap. The index of the RS sequence may be contiguous in carriers (e.g., carriers 1 and 2)

Referring to FIG. 8, valid RE(s) may be selected, and the RS sequence may be mapped to the valid RE(s). The RS sequence may not be mapped to REs belonging to the carrier gap. Therefore, the index of the RS sequence may not be set in REs belonging to the carrier gap. The index of the RS sequence in each of the carriers (e.g., carriers 1 and 2) may be independently set. The RS sequence index setting method in the exemplary embodiment of FIG. 8 may be different from the RS sequence index setting method in the exemplary embodiment of FIG. 7.

The methods (e.g., RE mapping methods and index setting methods) applied to DL RS and UL RS may be the same or different.

Method 2.2-8: The DL RS may be mapped to REs according to the exemplary embodiment of FIG. 6, and the UL RS may be mapped to REs according to the exemplary embodiment of FIG. 7 or 8.

Method 2.2-9: The DL RS and the UL RS may be mapped to REs according to the exemplary embodiment of FIG. 7.

The RS sequence may be a gold sequence, m sequence, or pseudo-noise sequence. In this case, even when the sequence indexes are discontinuous in a certain period, there will be no significant effect on a peak to average power ratio (PAPR) performance. In the present disclosure, the sequence index may mean an index of the RS sequence. When a computer-generated (CG) sequence or a Zadoff-Chu (ZC) sequence is used to reduce the PAPR, and the sequence indexes are discontinuous in a certain period, the PAPR performance may vary greatly. Discontinuous sequence indexes may mean different sequences. This may mean that the sequence is changed to a sequence that does not have characteristics that reduce the PAPR performance.

When the UL RS uses a ZC sequence, the ZC sequence may be newly generated for each carrier, and ZC sequences for carriers may be concatenated. Alternatively, the UL RS may be generated with one ZC sequence. When one sequence is generated as in the exemplary embodiment of FIG. 7 in a wideband UL RS transmission procedure, the PAPR performance may be excellent. Since UL RSs are transmitted in two or more carriers, multiplexing of different UL RSs transmitted in two or more carriers may be difficult. When short sequences are generated and aggregated as in the exemplary embodiment of FIG. 8 in a wideband UL RS transmission procedure, the PAPR performance may deteriorate, but multiplexing of the UL RSs may be easy.

When the terminal intends to transmit UL RSs in two or more carriers, an order of the two or more carriers may be defined. In a proposed method, the order of carriers may not be sorted according to serving cell indexes, carrier identifiers, or frequency indexes. The frequency index may be a frequency allocation index. For example, the frequency allocation index may be n20 or n49.

Method 2.2-10A: A sequence index may correspond first to a carrier (or serving cell) having a low center frequency based on common resource blocks (CRBs).

The frequency gap (e.g., carrier gap) between the carriers may be configured to the terminal. Alternatively, the frequency gap between the carriers may not be configured to the terminal. The frequency gap may be explicitly configured to the terminal. Alternatively, the frequency gap may be implicitly indicated to the terminal. The terminal may indirectly derive the frequency gap. The base station may configure or indicate the frequency gap to the terminal as an RB set using higher layer signaling. The terminal may identify the frequency gap (e.g., RB set) configured by the base station. According to the indication of the base station, the RB set may be limited to only RBs to which the RS is to be mapped, rather than the frequency gap. When there is no separate indication, the terminal may select RBs determined to be valid by a physical layer of the terminal. In order to reduce interference between the carriers, RBs corresponding to the frequency gap may not be used.

2.2.1.1 Guard Band

In a proposed method, the base station may configure or indicate a physical resource block (PRB) set to the terminal using RRC signaling. The PRB set may include one or more PRBs. The PRB set may include DL PRB(s) to which DL RSs can be mapped and/or UL PRB(s) to which UL RS can be mapped.

The RS may not be mapped to a PRB to which a DL PRB and/or a UL PRB does not belong. The PRB to which the RS is not mapped may be used as a guard tone. The PRB set may be configured for a reference numerology. Alternatively, the PRB set may be configured for each subcarrier spacing (SCS). The PRB set may be defined based on a starting CRB index determined based on a point A and the number of consecutive CRBs. For example, the PRB set may be defined in a CRB grid. In the present disclosure, the PRB set may be referred to as an RB set.

The RB set may be derived based on one RB index and the number of RBs. The RB set may represent both RBs to which data can be mapped or RBs to which data cannot be mapped. The RB(s) to which data is not mapped may be RB(s) belonging to the frequency gap. The RB set may include discontinuous RBs, and the discontinuous RBs may be interpreted as a gap (e.g., frequency gap).

Figure 9A:
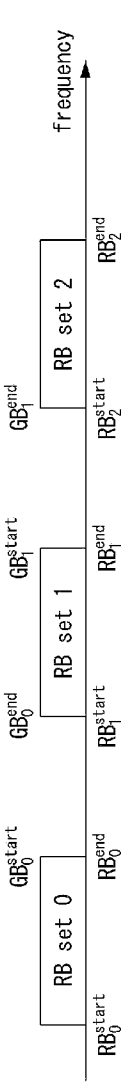
FIG. 9A is a conceptual diagram illustrating a first exemplary embodiment of an RB set.

FIG. 9A is a conceptual diagram illustrating a first exemplary embodiment of an RB set.

Referring to FIG. 9A, an RB set 0, RB set 1, and RB set 2 may be configured in the frequency domain, a gap (e.g., guard band (GB) 0) between the RB set 0 and the RB set 1 is may be configured, and a gap (e.g., GB 1) may be configured between the RB set 1 and the RB set 2. In other words, two gaps may be configured in the frequency domain. $GB_s^{start}$ may indicate a starting RB of a GB s, and $GB_s^{end}$ may indicate an ending RB of the GB s. RBI tart may be a starting RB of an RB set s, and $RB_s^{end}$ may indicate an ending RB of the RB set s. s may be an integer greater than or equal to 0. $RB_s^{end}$ or $GB_s^{end}$ may be expressed only by an RB index. Alternatively, $RB_s^{end}$ or $GB_s^{end}$ may be derived based on an RB index and the number of RBs. The RB set or GB may be indicated for each numerology.

A separate GB may not be indicated. In the UL RS mapping procedure, PRBs included in a serving cell or UL BWP configured in the terminal may be considered.

The UL RS resource may be an SRS resource for positioning. In this case, a transmission comb may be configured because the UL RS is an SRS. In PRBs belonging to the GB, the SRS may not be mapped. The SRS may be mapped in consideration of the transmission comb. In this case, the SRS may be considered to be mapped to different serving cells, one serving cell to which a UL BWP is connected, or a UL BWP.

According to technical specifications, the transmission comb of the SRS resource for positioning may have one value among 2, 4, and 8. Each of 2 and 4 may be a divisor of 12, and the guard PRBs may be indicated in units of PRBs. The UL RS may be mapped regardless of a starting PRB of the UL BWP.

When the transmission comb is indicated as 8, since a PRB includes 12 subcarriers, a starting PRB of the transmission comb may not be $N_{BWP}^{start}$ according to the starting PRB $N_{BWP}^{start}$ of the UL BWP. The above will be described in exemplary embodiments of FIGS. 9B and 9C below.

According to technical specifications, when a transmission comb is considered, mapping of UL RS may be considered from $N_{BWP}^{start}$. When the transmission comb is 8, RE mapping of UL RS may be repeated in units of 2 PRBs corresponding to 24 subcarriers, which is the least common multiple of 12 and 8.

Figure 9B:
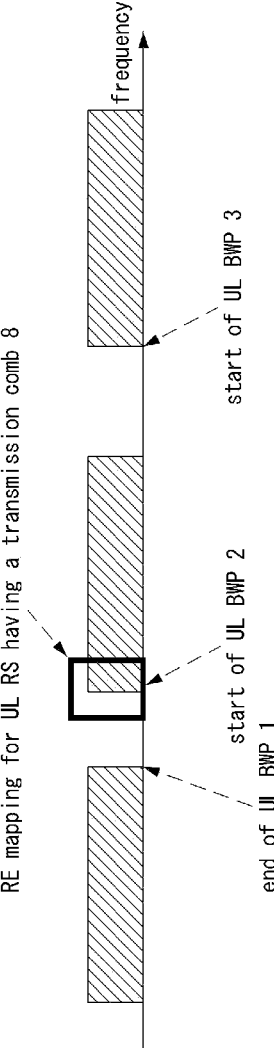
FIG. 9B is a conceptual diagram illustrating a first exemplary embodiment of a UL RS mapping method.

FIG. 9B is a conceptual diagram illustrating a first exemplary embodiment of a UL RS mapping method.

Referring to FIG. 9B, mapping of the UL RS may start in a PRB different from the starting PRB of the BWP. When mapping of the UL RS is performed in two or more carriers, $N_{BWP}^{start}$ and a PRB where RE mapping of the UL RS starts may be different from each other. Accordingly, the UL RS may not be multiplexed (e.g., CDMed) with UL RS(s) transmitted from other terminal(s).

Figure 9C:
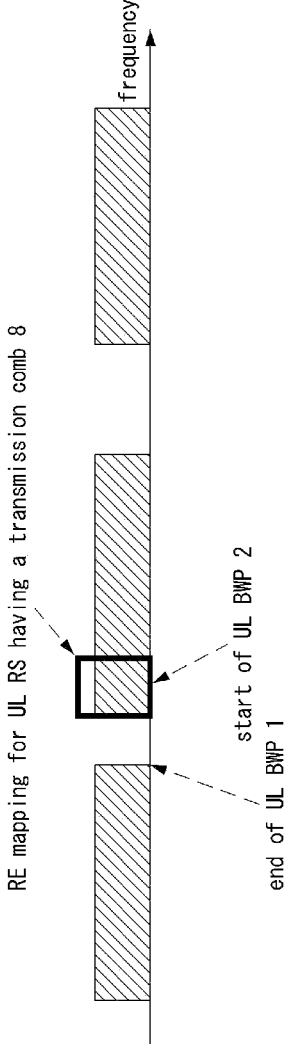
FIG. 9C is a conceptual diagram illustrating a second exemplary embodiment of a UL RS mapping method.

FIG. 9C is a conceptual diagram illustrating a second exemplary embodiment of a UL RS mapping method.

Referring to FIG. 9C, mapping of the UL RS may start from the same PRB as the starting PRB of the BWP. When mapping of the UL RS is performed in two or more carriers, $N_{BWP}^{start}$ and a PRB where RE mapping of the UL RS starts may be the same. Accordingly, the UL RS may be multiplexed (e.g., CDMed) with UL RS(s) transmitted from other terminal(s).

In order to support the CDM function for UL RSs, the following methods may be proposed.

Method 2.2-10B: When a transmission comb for a wideband UL RS is indicated and the wideband UL RS is mapped, the value of the transmission comb may not be a divisor of the number (e.g., 12) of subcarriers constituting a PRB of the transmission comb.

When the terminal transmits the UL RS, the transmission comb for the UL RS may be indicated as 2 and/or 4. Alternatively, when the terminal transmits the UL RS, a separate offset may be introduced so that the UL RS is mapped from the first PRB $N_{BWP}^{start}$ associated with the UL BWP. The first PRB may be the starting PRB.

Method 2.2-10C: An offset may be introduced in configuration of the UL RS associated with the UL BWP so that the PRB to which the UL RS is mapped is aligned with the starting PRB of the UL BWP. The starting PRB to which the UL RS is mapped may be derived based on the offset.

The starting PRB to which the UL RS is mapped may be derived based on a sum of $N_{BWP}^{start}$ and a separate offset (e.g., StartRBIndex). According to the exemplary embodiment of FIG. 9B, the offset may be set as n PRBs, and boundaries of PRBs to which the transmission comb is applied may be matched using the offset (e.g., n PRBs). n may be 1. Alternatively, n may be an odd number.

2.2.2 Sequence

The length of RS sequence may not exceed the maximum length defined in technical specifications. For example, the maximum bandwidth of BWP may be determined by the number of RBs in FR1 and FR2, and an RS sequence corresponding to the maximum bandwidth of BWP may be generated.

Considering the RS mapped to two or more carriers (or two or more serving cells), a method of mapping the sequence in the frequency gap (e.g., exemplary embodiment of FIG. 6) may be applied. A bandwidth to which the RS sequence is mapped may include two carriers as well as a gap between the two carriers. In some cases, the RS sequence may exceed the maximum supported length.

Method 2.2-11: When the RS (e.g., RS sequence) is mapped on two or more carriers, the length of the RS sequence may not be longer than that of a sequence corresponding to a specific bandwidth. The specific bandwidth may be the maximum bandwidth defined in the technical specifications (e.g., 275 PRBs).

The terminal may not generate the RS sequence, and may load and utilize an RS sequence stored in a memory. In this case, since there is a limitation of the memory, Method 2.2-11 may be applied. When the terminal generates the RS sequence, since there is no such limitation, the length of the RS sequence may be as long as necessary.

Method 2.2-12: When the RS (e.g., RS sequence) is mapped on two or more carriers, a sequence length corresponding to a sum of bandwidths of frequency layers or carriers may be utilized.

When a ZC sequence is used for the UL RS, the properties of the sequence may be configured differently for each serving cell. For example, a sequence shift and/or sequence group hopping may be configured differently for each serving cell. In this case, the base station may signal a serving cell identifier and/or sequence information to the terminal. When the RS is mapped on two or more carriers, different parameters may be set for each serving cell. The different parameters may include at least groupOrSequenceHopping.

Method 2.2-13: groupOrSequenceHopping may be set to one of neither, groupHopping, or sequenceHopping. groupOrSequenceHopping may be indicated differently for each serving cell (e.g., serving cell identifier).

When the UL RS is an SRS, a transmission comb applied to each carrier, serving cell, or BWP may be different. The transmission comb may mean an SRS mapping interval in the frequency domain. SRSs may be mapped at equal intervals according to the transmission comb value in the frequency domain. SRSs transmitted in the same symbol may be indicated to be frequency division multiplexed (FDMed) and/or code division multiplexed (CDMed). The transmission comb for the SRS may be specified by a comb offset and/or a cyclic shift.

According to a proposed method, the maximum number of transmission combs may be the same for all carriers, all serving cells, or all BWPs. For example, the transmission comb of the SRS may be set to one value n among 2, 4, or 8. The one value n may be used as the maximum value that a comb offset has. The comb offset may have at least one of values 0, 1, . . . , and n−1.

Method 2.2-14: When a transmission comb is applied to the UL RS (e.g., UL RS transmission), the maximum number of transmission combs (e.g., the maximum comb offset) may the same for all carriers, all serving cells, and/or all BWPs.

2.2.3 Tx Power

A method of determining a power of DL RS may be distinguished from a method of determining a power of UL RS.

The base station may transmit information of a DL RS energy per resource element (EPRE) to the terminal using higher layer signaling (e.g., higher layer signaling for DL RS configuration). The terminal may identify the DL RS EPRE indicated by the base station. The terminal may receive DL RSs and may assume the same power for the received DL RSs. The terminal may not assume the same power for DL RSs received in two or more carriers. According to a frequency regulation, adjacent channel leakage ratio (ACLR), emission, etc. may be defined differently for each carrier. Considering intra-band carriers, a path loss between the base station and the terminal may vary. Although the DL RS for one base station may be multiplexed with a physical downlink shared channel (PDSCH), it may be preferable to adjust the transmit power of the DL RS considering interference caused by the DL RS to a neighboring base station.

Method 2.2-15: When the terminal receives a DL RS from two or more carriers or two or more serving cells, a Tx power for the DL RS may be indicated or configured for each serving cell or carrier.

When the same EPRE is applied to a plurality of serving cells or a plurality of carriers, a path loss of the DL RS may be derived based on one serving cell or one carrier. A method for deriving a path loss for an UL RS may be applied to the DL RS. The same EPRE may refer to the same DL RS EPRE or the same UL RS EPRE.

Method 2.2-16: When the terminal receives a DL RS in two or more carriers or two or more serving cells, a Tx power therefor may be derived based on DL RS configuration information. The derived Tx power may be applied to the two or more carriers or two or more serving cells.

In the UL RS transmission procedure, a method of allocating different Tx powers in carrier(s) or serving cell(s) through which the UL RS is transmitted may be considered. The method is illustrated in FIGS. 5 and/or 10.

Figure 10:
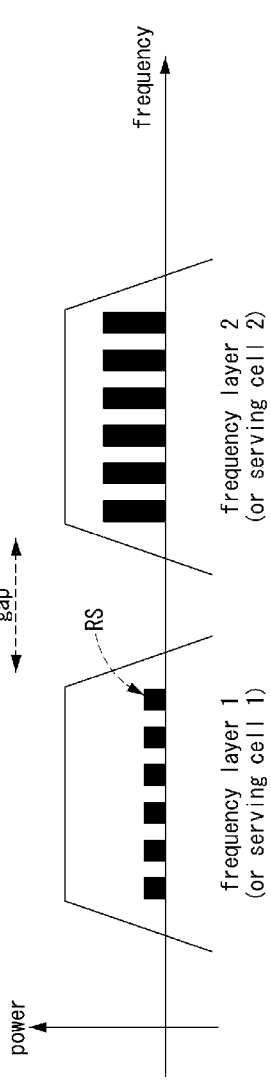
FIG. 10 is a conceptual diagram illustrating a first exemplary embodiment of a method of receiving a DL RS or a method of transmitting a UL RS.

FIG. 10 is a conceptual diagram illustrating a first exemplary embodiment of a method of receiving a DL RS or a method of transmitting a UL RS.

Referring to FIG. 10, Tx powers in two carriers may be set independently. A Tx power in a carrier 1 may be a Tx power 1, and a Tx power in a carrier 2 may be a Tx power 2. The base station may transmit a DL RS using the Tx power 1 in the carrier 1 and may transmit a DL RS using the Tx power 2 in the carrier 2. The terminal may transmit a UL RS using the Tx power 1 in the carrier 1, and may transmit a UL RS using the Tx power 2 in the carrier 2.

Method 2.2-17: a Tx power of a UL RS may be equally applied to REs of the RS. The REs may be REs to which the RS is mapped.

When UL RS s are transmitted in a plurality of serving cells or a plurality of carriers, EPREs for the UL RSs in the plurality of serving cells or the plurality of carriers may be the same. In other words, EPREs for the UL RSs in the plurality of serving cells or the plurality of carriers may be constant.

According to the exemplary embodiment of FIG. 5, the same EPRE may be applied to different carriers or different serving cells. The above-described operation may be interpreted as an operation in which a Tx power applied by the terminal is allocated, but the Tx power is not adjusted for each sub-band. The above-described operation will be described in detail below.

When the EPRE is maintained at the same value in two or more serving cells, a large scale fading that is different for each serving cell may occur. Therefore, in a UL RS detection operation, a strength of a signal received by the base station from each serving cell may be different. When a UL RS detection operation (e.g., decorrelation operation) is performed, an effect on a specific serving cell may be interpreted as greater. In order to compensate for the above-described problem, the base station may compensate the strength of the received signal for each serving cell, and then perform the UL RS detection operation. The signal and a noise may be amplified or reduced together. Therefore, it may be preferable to amplify only the signal excluding the noise.

A different Tx power of a UL RS for each sub-band or serving cell may be allocated to the terminal. It may be preferable to allocate the Tx power to compensate for a large fading of the serving cell. In this case, the terminal may transmit the UL RS based on the Tx power allocated in the serving cells, and the base station may receive the UL RS having a similar strength for each serving cell from the terminal. When the UL RS detection operation is performed, accuracies of detecting the UL RS by serving cells may be similar.

Method 2.2-18: When carriers in which the UL RS is to be transmitted correspond to all serving cells, the terminal may apply a Tx power indicated in each serving cell to each carrier.

The carriers to which UL RSs are mapped may be divided into carrier(s) for the serving cell and carrier(s) for other cells. When a carrier set 1 is a set for the serving cell, the Tx power for the UL RS may be controlled in a closed loop scheme. When a carrier set 2 is a set for other cells, the Tx power for the UL RS may not be defined.

When transmitting the UL RS in a carrier belonging to the carrier set 2, the terminal may refer to a carrier belonging to the carrier set 2 to determine a Tx power. For example, when a Tx power of a UL RS transmitted in the carrier set 1 is indicated as P1, the terminal may regard a Tx power of a UL RS transmitted in the carrier set 2 as P1. The Tx power of the UL RS transmitted in the carrier set 2 may not be explicitly indicated to the terminal.

Method 2.2-19: When a Tx power for a certain carrier is not indicated to the terminal, the terminal may apply a Tx power indicated in a carrier adjacent to the certain carrier to the certain carrier.

Considering arrangements of carriers belonging to the carrier set 1 and carriers belonging to the carrier set 2, a situation in which it is difficult to determine a Tx power may occur. For example, when a carrier 1, carrier 2, and carrier 3 are arranged in an order of center frequencies, the terminal may determine that the carriers 1 and 3 belong to the carrier set 1, and the carrier 2 belongs to the carrier set 2. In this case, it may be difficult to determine a Tx power of a UL RS transmitted in the carrier 2.

Method 2.2-20: It may be assumed that the terminal does not transmit a UL RS in a carrier belonging to the carrier set 2.

The base station may determine that an influence of interference is not large, and the base station may receive a UL RS in a carrier belonging to the carrier set 2. In this case (e.g., when Method 2.2-20 is not applied), the terminal may determine a Tx power by utilizing information elements indicated to the terminal.

Method 2.2-21: In order to derive a Tx power of a UL RS transmitted in the carrier 2, the terminal may reuse a Tx power of a DL RS or UL RS indicating a Tx beam of the UL RS transmitted in the carrier 2.

The RS (e.g., DL RS or UL RS) indicating the Tx beam of the UL RS may indicate a TCI-State to the terminal. The RS indicating the Tx beam of the UL RS may be an RS utilized as a path loss RS.

Method 2.2-22: In order to derive a Tx power of a UL RS transmitted in the carrier 2, the terminal may use a Tx power derived using at least one of a synchronization signal/physical broadcast channel (SS/PBCH) block or DL RS received in the carrier 2.

When one SS/PBCH block is received in a carrier belonging to the carrier 2, the terminal may apply a Tx power derived from the one SS/PBCH block to the UL RS. When a plurality of SS/PBCH blocks are received, the terminal may select one SS/PBCH block from among the plurality of SS/PBCH blocks, and determine the Tx power based on the selected SS/PBCH block. Alternatively, the terminal may determine the Tx power using a value (e.g., average) derived based on Tx powers of the plurality of SS/PBCH blocks.

A power of a DL RS or UL RS may be indicated on a resource set basis. For example, a Tx power of a PRS may be indicated to the terminal by higher layer signaling (e.g., RRC signaling or LPP signaling). The Tx power of the PRS may be indicated on a resource set basis. Here, a PRS resource set may include one or more PRS resources.

According to technical specifications, a power control parameter set may be indicated for each DL PRS resource set (or SRS resource set). For example, a Tx power (or EPRE) may be indicated to the terminal by dl-PRS-ResourcePower, which may be included in each PRS resource set for DL PRS. For example, alpha and Po, which may be included in each SRS resource set for SRS, may be indicated to the terminal.

A power control parameter set may be indicated for a PRS resource as well as a PRS resource set. In this case, a power control parameter set for one of a PRS resource set and a PRS resource may be selected, and the selected power control parameter set may be used to perform PRS measurement.

According to a proposed method, when a power control parameter set is indicated for a PRS resource, the power control parameter set indicated for the PRS resource may be selected.

For example, a Tx power (or EPRE) for each PRS resource belonging to a PRS resource set for DL PRS may be indicated to the terminal. In this case, the terminal may perform measurement (e.g., reference signal timing difference (RSTD) measurement, UE Tx-Rx time difference measurement, etc.) using parameter(s) associated with the PRS resource. The base station may apply parameter(s) associated with the PRS resource to determine a Tx power for transmitting the PRS.

For example, alpha and Po may be indicated to the terminal for each SRS resource belonging to the SRS resource set for the SRS. In this case, the terminal may perform transmission using parameters associated with the SRS resource. The base station may perform measurement (e.g., RSTD measurement, UE Tx-Rx time difference measurement, etc.) using parameters associated with the SRS resource.

2.2.3.1 Exemplary Embodiments for Path Loss Derivation

Regardless of a carrier set, the DL RS and/or UL RS may be transmitted using the same time resource, the same frequency resource, and the same antenna resource (e.g., the same antenna reference point). In this case, it may be difficult for the terminal to allocate a different Tx power for each frequency resource. Here, the Tx power may be a different Tx power or distinct Tx power for each sub-band. The Tx power may have a different power spectral density or distinct power spectral density. Accordingly, even when the DL RS and/or the UL RS are transmitted in two or more carriers (or two or more serving cells), the DL RS and/or the UL RS may have the same EPRE.

In the present disclosure, the DL RS and/or UL RS may be referred to as a PRS.

A pathloss (PL) RS referred to by a PRS (e.g., DL RS and/or UL RS) may be configured separately. A path loss for a DL signal/channel received in a carrier or a BWP of a serving cell may be derived. The path loss may be derived based on $P_{CMAX,f,c}$ and a reference signal received power (RSRP). In a proposed method, in order for a PRS to maintain the same RS RE (or the same EPRE) in two or more carriers or two or more serving cells, a separate power control parameter (e.g., separate open loop power control) parameter) may be configured. Here, a closed-loop power control may not be considered.

Method 2.2-23: When a PRS (e.g., DL RS and/or UL RS) is transmitted and received in two or more carriers or two or more serving cells, a separate power control parameter set may be configured or indicated to the terminal.

The base station may transmit information of a power control parameter set to the terminal, and the terminal may receive the information of the power control parameter set from the base station. The terminal may transmit a UL RS based on the power control parameter set in two or more carriers or two or more serving cells. The UL RS transmitted in two or more carriers or two or more serving cells may be a wideband UL RS. The power control parameter set may indicate at least one of Po or PL RS. Here, Po may be a power value indicated by the base station to the terminal. When the terminal fully compensates for a path loss, Po may be a power received at the base station. The power control parameter set may be applied to a PRS resource or a PRS resource set.

When a PL RS is not indicated to the terminal, an SSB (e.g., SS/PBCH block) may be used to derive a path loss. When a PRS is transmitted in two or more carriers, the base station may indicate a PL RS to the terminal in all carriers or in each of some carriers. The PL RS indicated to the terminal may be commonly applied to two or more carriers or all carriers. An RSRP of the PL RS may be measured. A Tx power of the PRS may be indicated to the terminal. The terminal may derive a path loss using a difference between the Tx power of the PRS and the RSRP. The path loss may be utilized to determine or derive a Tx power. When the Tx power is derived, the PRS may be allocated to have the same EPRE.

Method 2.2-24: When a PL RS referred to by a PRS (e.g., DL RS and/or UL RS) is indicated, the PL RS may be applied to two or more carriers or all carriers, and a path loss is may be derived based on the PL RS.

Methods of deriving an effective path loss will be described in the following exemplary embodiments.

When a PL RS is indicated to the terminal, the terminal may use only the PL RS to calculate a path loss. The PL RS may be a DL RS. The PL RS may be an SSB or channel state information (CSI)-RS belonging to one carrier. Alternatively, the PL RS may be two or more SSBs, two or more CSI-RSs, or two or more PRSs belonging to two or more carriers.

Method 2.2-25: DL RSs received in two or more carriers may be utilized as PL RSs to derive a path loss.

The above-described method may be the simplest method configurable by the base station, but there may be many constraints for PL RS configuration. In a proposed method, path losses measured in adjacent carriers may have similar values. A Tx power of a UL RS may be derived using a path loss measured in one reference carrier. In other words, the terminal may measure a path loss based on a PL RS received from the base station, derive a Tx power based on the path loss, and transmit a UL RS based on the Tx power.

Path losses in adjacent carriers may be different. Therefore, in order to derive an accurate path loss, the terminal may derive a path loss using each DL RS received in each carrier. Each path loss may be expressed as a path loss i. i may be a natural number. One value (e.g., effective path loss) based on a combination of path loss(es) may be used to derive a Tx power. For example, the effective path loss may be the smallest path loss or the largest path loss among the path losses. Alternatively, the effective path loss may be an arithmetic average of the path losses.

The base station may indicate filter coefficients applied to L3 filtering to the terminal using signaling (e.g., RRC signaling or LPP signaling). Different filter coefficients may be indicated for each serving cell. When deriving an effective path loss, the same filter coefficients may be applied for a path loss i. The number of samples of the DL RS (e.g., PL RS i) for deriving the pathloss i or the number of samples of the PL RS i utilized to calculate an average (e.g., moving average) may be different for each carrier. The above exemplary embodiment may vary depending on the implementation of the terminal. According to a proposed method, the path loss i of each carrier may be measured using the same slot or the samples of the PL RS i for each carrier. In order to derive an effective path loss, the same slot or samples of the PL RS i may be used for the PL RS i received in each carrier. When the PL RS i is received in each carrier, the PL RS i may be the same type of PL RS. For example, the PL RS i may be a CSI-RS or SSB in all carriers.

When a plurality of PL RSs are configured in the terminal, a separate technical specification or processing for effective path loss derivation may be required. When one PL RS i is received in a plurality of carriers, a path loss may be easily calculated based on the one PL RS i.

Method 2.2-26: In order to indicate a PL RS for a UL RS, the base station may transmit identification information (e.g., absolute radio frequency channel number (ARFCN) or serving cell index) of a carrier and/or an identifier of a DL RS to the terminal.

2.2.3.3 Exemplary Embodiments of Deriving a Tx Power for Each Frequency

A Tx power may compensate for a part of the path loss or the entire path loss. A method of dynamically controlling the Tx power may be used. The maximum power (e.g., maximum Tx power) may be derived for each serving cell, and the terminal may use a power less than or equal to the maximum power. When an UL RS is transmitted in two or more carriers, the maximum power condition (e.g., maximum Tx power condition) should be satisfied in any serving cell.

Method 2.2-27: A Tx power of a UL RS may be derived so as not to exceed the maximum power of the corresponding carrier (e.g., the carrier through which the UL RS is transmitted). The terminal may transmit the UL RS based on the derived Tx power.

The terminal may derive a Tx power based on a power control parameter set indicated by the base station. A Tx power for each of serving cells may be derived, and the Tx power derived from each of serving cells may not exceed the maximum power. The terminal may transmit the UL RS using the Tx power derived from each of serving cells.

A PL RS of a UL RS may be referred to as q, and a DL RS indicating a TCI state may be referred to as $q_s$. A loop that dynamically controls a power may be referred to as 1, and a frequency resource through which the UL RS is transmitted may be referred to as b, f, and/or c. b may mean a BWP, f may mean a carrier, and c may mean a serving cell.

A Tx power of a UL RS at a transmission occasion i may be expressed as $P(i,q_s)=\Sigma_f P_{b,f,c}(i,q_s)$. $\Sigma_f(\cdot)$ may mean a sum of carriers f and/or serving cells c for a BWP(b).

A power $P_{b,f,c}(i,q_s)$ allocated in a frequency resource may not exceed $P_{CMAX,f,c}$. To clarify the above definition, a power density may be used. When a method in which an EPRE of the UL RS remains the same is applied (e.g., when Method 2.2-17 is applied), a power used for each carrier may be derived by multiplying the EPRE and a carrier bandwidth. The equations below may be used.

$$P_{b,f,c}(i,q_s)=\min\{P_{CMAX,f,c}(i),P_{O,b,f,c}(q_s)+10\cdot\log_{10}(2^\mu\cdot M_{b,f,c}(i)+\alpha_{b,f,c}(q_s)\cdot PL_{b,f,c}(q_d)\}$$ [Equation 1]

A power allocated to each carrier may be determined in direct proportion to a bandwidth based on a total Tx power.

If a linear scale of $P_{b,f,c}(i,q_s)$ expressed in decibels (dB) is referred to as $\hat{P}_{b,f,c}(i,q_s)$, Equation 2 below may be applied to a linear scale $\hat{P}(i,q_s)$ of a TX power $P(i,q_s)$ of the UL RS. $\Sigma_f(M_{b,f,c}(i))=M(i)$ may be defined. M(i) may correspond to the total number of RBs through which the UL RS is transmitted.

$$\hat{P}(i, q_s) = \hat{P}_{b,f,c}(i, q_s)\cdot\frac{M(i)}{M_{b,f,c}(i)},$$ [Equation 2]

$$P_{b,f,c}(i, q_s) = P(i, q_s) - 10\cdot\log_{10}(2^\mu\cdot M(i)) + 10\cdot\log_{10}(2^\mu\cdot M_{b,f,c}(i))$$

According to Method 2.2-27, assuming that new parameters are applied, the Tx power of the terminal may be defined as in Equation 3 below. The terminal may apply an effective path loss and an effective bandwidth.

$$P(i,q_s)=P_O(q_s)+10\cdot\log_{10}(2^\mu\cdot M(i))+\alpha(q_s)\cdot PL(q_d)$$ [Equation 3]

$P_{b,f,c}(i,q_s)$ applied by the terminal for each frequency band may not exceed the maximum power $P_{CMAX,f,c}(i)$. $P_{b,f,c}(i,q_s)$ may preferably satisfy Equation 4 below.

$$P(i,q_s)-10\cdot\log_{10}(2^\mu\cdot M(i))+10\cdot\log_{10}(2^\mu\cdot M_{b,f,c}(i))\leq P_{CMAX,f,c}(i),\ \forall\{b,f,c\}$$ [Equation 4]

In an actual transmission procedure, a separate condition may be satisfied so that the Tx power of the terminal does not exceed the maximum power $P_{MAX}(i)$.

$$P(i,q_s)\leq P_{MAX}(i)$$ [Equation 5]

When the Tx power of the terminal exceeds the maximum power, Tx power(s) allocated to some serving cells may be adjusted according to priorities of the respective serving cells (or UL BWPs) and UL signals/channels.

According to technical specifications, an order of 'PRACH transmission of a primary cell (PCell)', 'PUCCH transmission including a HARQ-ACK, scheduling request (SR), and/or link recovery request (LRR)', 'UCCH transmission or PUSCH transmission including CSI', 'PUSCH transmission where a HARQ-ACK or CSI is not multiplexed', 'PUSCH transmission related to a MsgA (or Type-2 random access)', 'PUSCH transmission of a PCell', 'aperiodic SRS transmission', 'PRACH transmission transmitted in a serving cell other than PCell', 'semi-persistent SRS transmission', and/or 'periodic SRS transmission' may be applied. In the above-described order, the PRACH transmission of the PCell may have the highest priority, and the aperiodic SRS transmission or periodic SRS transmission may have the lowest priority.

When a carrier aggregation is performed, the terminal may interpret the transmission priority of the PCell as higher and that of a secondary cell (SCell) as lower. If two UL carriers (e.g., non-supplementary carrier and supplementary carrier) are configured to the terminal, the terminal may interpret a priority of a carrier capable of transmitting a PUCCH as higher. If a PUCCH is not configured in two UL carriers, the terminal may interpret the lower priority for transmission in a supplementary UL (SUL) carrier.

In order for the proposed methods to be applied, since the terminal allocates the same EPRE to the SRS, unlike technical specifications, the Tx power allocated for SRS transmission may be scaled so that it is equally reduced in all serving cells. For example, even when the Tx power allocated to transmission of the SRS in some serving cells is scaled to decrease, the Tx power that can be allocated in other serving cells may be appropriately reduced. According to the above-described operation, the UL RSs may have the same EPRE.

2.2.4 TCI state 2.2.4.1 Beam Indication

A beam of an RS may be classified into an Rx beam of a DL RS and a Tx beam of a UL RS.

In order to determine a Tx beam of a UL RS, at least one of a DL RS, SSB, or SRS may be used. For example, when an SRS, which is a UL RS, is configured to the terminal, parameters included in SpatialRelationInfoPos may be used. One of servingRS, ssb-Ncell, or dl-RS included in Spatial-RelationInfoPos may be selected.

When servingRS is selected (e.g., when SpatialRelation-InfoPos includes servingRS), a parameter (e.g., servingRS) indicated to the terminal may include at least a serving cell identifier, and at least one of an SSB, CSI-RS, or SRS may be selected. The SSB may be identified by an SSB index. The SRS may be identified by an identifier of a UL BWP. The terminal may select one RS among RS s configured by the base station. The RS selected by the terminal may be limited to one serving cell.

When ssb-Ncell is selected (e.g., when SpatialRelation-InfoPos includes ssb-Ncell), a parameter (e.g., ssb-Ncell) indicated to the terminal may include at least one of a physical cell identifier (PCI), SSB index, or SSB configuration. The SSB configuration may include an ARFCH, halfFrameIndex, SCS, SSB period, system frame number (SFN) offset, and/or numerology. The terminal may know a frequency band using the ARFCN, and may know symbols using halfFrameIndex and SSB index.

When dl-RS is selected (e.g., when SpatialRelationInfo-Pos includes dl-RS), a parameter (e.g., dl-RS) indicated to the terminal may include an identifier of a DL RS.

When the terminal transmits the UL RS in two or more carriers, the terminal may determine the Tx beam of the UL RS based on parameter(s) included in servingRS. In this case, the terminal should know which UL RS corresponding to which UL BWP is considered in a serving cell. Therefore, the parameters indicated to the terminal may include not only the serving cell index (or serving cell identifier) but also the identifier of the UP BWP.

Method 2.2-28: When a UL RS is transmitted in two or more carriers, information indicating a Tx beam of the UL RS may include a BWP identifier as well as a serving cell index.

When a CSI-RS is selected, parameters indicated to the terminal may include a serving cell index and/or a DL BWP identifier. For example, when an SRS is selected, parameters indicated to the terminal may include a serving cell index and/or a UL BWP identifier.

When a BWP identifier is not indicated to the terminal, an active UL BWP or active DL BWP may be assumed. Alternatively, an initial UL BWP or initial DL BWP may be assumed.

Since the UL RS is transmitted in two or more serving cells, it may be difficult to determine a Tx beam in another serving cell in which the DL RS is not received using only the DL RS received in one serving cell. In other words, using only the DL RS received in one serving cell, the accuracy of determining the Tx beam in another serving cell in which no DL RS is received may be low. In this case, it may be preferable for the terminal to receive the DL RS using one Rx beam in all serving cells to which the terminal desires to transmit the UL RS. The DL PRS may be used. The DL PRS may be used as an essential condition referred to by the UL RS.

Method 2.2-29: A DL RS providing a Tx beam of a UL RS transmitted in two or more serving cells may be received in serving cells including the two or more serving cells. The terminal may identify the Tx beam of the UL RS based on the DL RS, and transmit the UL RS using the Tx beam. The Tx beams in two or more serving cells may be independently determined.

In order to determine an Rx beam of a DL RS, the terminal may select either an SSB or DL RS. When the terminal selects an SSB, parameters indicated to the terminal may include at least one of a PCI, SSB index, or QCL type. When the terminal selects a DL RS, parameters indicated to the terminal may include at least one of a DL RS resource or a DL RS resource set.

When the terminal receives the DL RS in two or more carriers, information on the two or more carriers may be required. Parameters indicated to the terminal may include at least one of an ARFCN or serving cell index. For example, information element(s) included in ssb-Ncell may be utilized. The ARFCN, halfFrameIndex, SCS, SSB period, SFN offset, and/or numerology may be utilized.

Method 2.2-30: In order for the terminal to receive a DL RS in two or more carriers, an ARFCN of an SSB and/or a serving cell index may be indicated to the terminal. A TCI state may be indicated by the ARFCN of the SSB and/or the serving cell index.

2.2.4.2 Timing Reference

The base station may indicate or configure qcl-typeC (e.g., rough time synchronization and/or rough frequency synchronization) of a DL RS to the terminal. The terminal may obtain qcl-typeC of the DL RS from the base station. The base station may select one of an SSB or DL RS, and may indicate the selected SSB or DL RS to the terminal. In other words, information of the selected SSB or information of the selected DL RS may be transmitted to the terminal. When an SSB is selected, the base station may indicate at least one of a PCI, SSB index, qcl-typeC, or qcl-typeD to the terminal. When a DL RS is selected, the base station may indicate at least one of a DL RS resource ID and a DL RS resource set ID to the terminal.

When two or more carriers are used, additional information may be required in addition to the SSB. In this case, the base station may provide specific frequency information to the terminal. The specific frequency information may include at least one of an AFRCN to which the SSB belongs or an index of a serving cell to which the SSB belongs.

Method 2.2-31: In order to inform the terminal of a reception timing (e.g., reception time) of a DL RS, the base station may transmit information of a frequency of an SSB to the terminal by using signaling (e.g., higher layer signaling). The terminal may receive the information of the frequency of the SSB from the base station. The information of the frequency of the SSB may include at least one of an ARFCN or a serving cell index.

When the terminal intends to transmit a UL RS in a plurality of carriers and the plurality of carriers belong to the same frequency band, a difference in propagation delay between the plurality of carriers may not be large. Therefore, the terminal may apply the same timing advance command (TAC) to the plurality of carriers. If there is even one carrier belonging to a carrier set 1, the terminal may transmit the UL RS in a plurality of carriers using a TAC indicated by a serving cell belonging to the one carrier.

When the terminal supports an intra-band CA operation, a difference between symbol boundaries (e.g., DL symbol boundaries) of serving cells in a DL resource grid of the terminal may be up to 3 μs. In this case, even when an SFN offset and/or a slot offset are compensated, a UL symbol (e.g., UL symbol boundary) in a serving cell 1 and a UL symbol (e.g., UL symbol boundary) in a serving cell 2 may not be aligned. In this situation, the terminal may select one serving cell and derive a transmission timing of the UL RS by applying a TAC using a symbol boundary of the selected serving cell.

When the terminal transmits a UL RS in a plurality of carriers, additional information as well as a TAC may be required to derive a transmission timing of the UL RS. For RS transmission, the terminal may receive a MAC CE including a TAC from serving cells or serving cell(s) belonging to the same TA group (TAG). The base station may serve a plurality of terminals and may receive UL RSs from the plurality of terminals. To maintain orthogonality of the UL RSs, the base station may manage appropriate TACs of the respective plurality of terminals.

The base station may configure or indicate a TAC to the terminal. The terminal may identify the TAC configured by the base station. The TAC may be an absolute value or a relative difference value of a TA. When a relative difference value of the TA is indicated to the terminal, the terminal may derive a new TA by reflecting the relative difference value to the TA of the serving cell. The terminal may change the TA itself. The terminal may maintain a TA error below a specific threshold. Therefore, the terminal may derive a new TA by itself.

The terminal may maintain different TAs for the respective serving cells. Since the terminal is able to change the TA by itself, the base station may not accurately know a difference in TA between serving cells. The terminal may report a difference in TA between serving cells to the base station. The base station may receive information on the difference in TA from the terminal.

Method 2.2-32: The terminal may report a difference in TA between serving cells belonging to the same TAG to the base station Alternatively, the terminal may select one serving cell from among a plurality of serving cells, and may unify a boundary of a DL resource grid of the one serving cell and a TA applied from the boundary. Some interference to a serving cell other than the reference serving cell may occur in the base station.

The reference cell indicated to the terminal may be an activated serving cell or a deactivated serving cell. A frequency resource that is a reference transmission timing of the UL RS may be an unconfigured frequency resource. The base station may indicate to the terminal the frequency resource that is the reference transmission timing of the UL RS. The terminal may identify the reference transmission timing (e.g., frequency resource) indicated by the base station.

Method 2.2-33: A reference serving cell (or reference frequency resource) for TA derivation may be a serving cell (or frequency resource) activated in the terminal.

The reference serving cell (or reference frequency resource) for TA derivation may be deactivated in the terminal. Alternatively, the reference serving cell (or reference frequency resource) for TA derivation may not be configured in the terminal as a serving cell. UL RS resources in two or more carriers (or two or more serving cells) may be configured to the terminal using RRC signaling. Activation/deactivation of a serving cell may be indicated to the terminal by a MAC CE. Switching of a UL BWP may be indicated to the terminal by DCI.

When a UL BWP is indicated to the terminal in a deactivated serving cell, the terminal may transmit a UL RS. In this case, the terminal may transmit the UL RS using the same TA as a TA of the reference serving cell.

Alternatively, in another exemplary embodiment, a TA may be assumed based on a DL RS or UL RS referred to for identification of a TCI or spatial relation of the UL RS. In other words, the terminal may apply a TA corresponding to a value most recently updated by the terminal from a reception time at which the DL RS is received. Alternatively, the terminal may apply a TA to have the same transmission timing as the transmission timing of the UL RS.

2.2.4.2.1 Timing Advance (TA)

The terminal may update a TA at a boundary of a DL slot (or DL subframe). BWPs to which different numerologies are applied in two or more serving cells or two or more carriers may be considered. In this case, a middle of a slot (or subframe) in a DL BWP belonging to one carrier may be a boundary of a slot (or subframe) in a DL BWP belonging to another carrier. In this case, the terminal may update the TA using an SSB received in each BWP. A change in a reception time point (timing) or a change in a transmission time point (timing) may occur at a boundary between a DL slot (or subframe) or a UL slot (or subframe). In the present disclosure, a time point may mean a time.

In two or more carriers or two or more serving cells, the terminal may expect DL RS(s) to be received in DL BWP(s) (e.g., frequency resources) having the same numerology. When slot boundaries are not aligned in two or more carriers or two or more serving cells or when a reception timing of an SSB belonging to some carriers or some serving cells is to be updated, the terminal may not change the reception time point for a carrier or a serving cell.

Method 2.2-34: For a carrier or serving cell for which an SSB reception time point is to be updated, the terminal may not change the reception time point of the carrier or the serving cell while receiving the DL RS.

The terminal may transmit a UL RS in two or more carriers or two or more serving cells. In this case, the terminal may expect to transmit UL RS(s) in UL BWP(s) (e.g., frequency resource(s)) having the same numerology. Associated DL BWPs may not have the same numerology. This may mean that slot boundaries are not aligned in the associated DL BWPs. In some frequency resources, an SSB or DL RS reception time point may be updated. This may mean that a TA is changed. According to a proposed method, the terminal may not change a transmission time point for a carrier or serving cell while transmitting the UL RS.

Method 2.2-35: For a carrier or serving cell for which a TA is to be updated, the terminal may not change a transmission time point for the carrier or the serving cell while transmitting the UL RS.

2.2.5 Subcarrier Spacing (SCS)

When an RS is transmitted and received in one carrier, one numerology may be indicated or configured to the terminal. Information of a numerology for a DL RS may be included in configuration information of a DL RS resource. The numerology for the UL RS may be a numerology applied to an active UL BWP or an initial UL BWP.

Alternatively, frequency resources to which a plurality of numerologies for a DL RS are applied may be distinguished.

Method 2.2-36: When a DL RS is received in two or more positioning frequency layers (PFLs), and the two or more PFLs belong to different serving cells, each of the different numerologies may be applied in each PFL or each serving cell.

Method 2.2-37: One PFL may be a reference PFL, one serving cell may be a reference serving cell, one numerology may be determined based on the reference PFL or the reference serving cell, and the one numerology may be applied to a DL RS.

Method 2.2-38: The same numerology may be applied to DL RSs received in two or more PFLs.

In order to lower a PAPR, one numerology may be applied to a UL RS even when serving cells to which the respective carriers belong are different.

Method 2.2-39: The terminal may select one serving cell from among a plurality of serving cells, and generate a UL RS using a numerology applied to an active UL BWP or an initial UL BWP in the one serving cell, and transmit the UL RS.

The reference numerology may be indicated or configured to the terminal. The terminal may use the reference numerology to transmit the UL RS in all serving cells.

2.2.6 Priority Handling by Dropping

A part of (or entire) UL RS transmission (e.g., UL RS) may be canceled by another UL transmission (e.g., another UL signal/channel). For example, when the terminal receives scheduling information for PUSCH transmission or PUCCH transmission, the UL RS transmission may be canceled in units of symbols by the PUSCH transmission or the PUCCH transmission. The terminal may receive a DCI format 2_4 (e.g., uplink cancellation indicator (ULCI)) from the base station, and may cancel the UL RS transmission in units of symbols based on the DCI format 2_4.

The base station may receive all UL RSs and utilize all the UL RSs for positioning measurement.

A TA for UL RS transmission may be different from a TA for other UL signal/channel transmissions. Therefore, even when a symbol through which the UL RS is transmitted and a symbol through which the UL signal/channel is transmitted do not overlap, the UL RS transmission and UL signal/channel transmission may collide in the time domain. In this case, a priority between the UL RS transmission and the UL signal/channel transmission may be defined in technical specifications. Alternatively, the priority between the UL RS transmission and the UL signal/channel transmission may be indicated by RRC signaling.

When an SRS is used as a UL RS, and a collision occurs between UL RS transmission (e.g., SRS transmission) and UL signal/channel transmission, a priority defined in technical specifications may be applied to the UL RS transmission and UL signal/channel transmission. The above-described operation may be applied per BWP. When the UL RS is transmitted in two or more carriers or two or more serving cells, the UL RS transmission may not be canceled or dropped in some frequency resources.

The terminal may drop the UL RS transmission in units of symbols. In this case, a UL RS transmittable in some frequency resources may be unnecessarily dropped. It may be preferable for the UL RS to be transmitted in a frequency resource where the UL RS transmission is not dropped.

Method 2.2-40: The terminal may cancel UL RS transmission in units of symbols in some carriers.

Even when the UL RS is transmitted using one antenna port, the UL RS may be transmitted in a plurality of symbols. Even in this case, Method 2.2-40 may be applied.

The terminal may transmit a UL RS in some carriers, but coherence for the UL RS transmission may not be maintained due to UL signal/channel transmission in other carriers. In this case, the terminal may perform the UL RS transmission so that the UL signal/channel transmission and the UL RS transmission are not FDMed. When the UL signal/channel transmission and the UL RS transmission are not FDMed, the base station may utilize the UL RS for positioning measurement. In order to transmit the UL RS in two or more carriers, it may be preferable to utilize the entire band configured to the terminal.

Method 2.2-41: The terminal may expect not to transmit a UL signal/channel for the same antenna port or the same antenna reference point (ARP) while transmitting the UL RS.

Method 2.2-42: The terminal may cancel a part of UL RS transmission in units of symbols including the entire band.

2.3 DL RS Measurement Method

According to a measurement quantity, a reception strength of an RS may be directly measured. Alternatively, a reception strength of an RS may be used as an intermediate quantity for deriving another value using the RS.

For example, when a measurement quantity is an RSRP, reference signal received quality (RSRQ), signal to interference noise ratio (SINR), or received signal strength indicator (RSSI), a reception strength of an RS may be measured. When a measurement quantity is an RSTD or Rx-Tx time difference, a reception time of an RS may be measured, and a difference between the measured reception time and a reference time may be derived.

For example, when a measurement quantity is a channel quality indicator (CQI), a reception strength of an RS may indicate a frequency efficiency for obtaining a block error rate (BLER) in a decoding procedure of a virtual PDSCH. A DL RS may be a CSI-RS. The terminal may receive the CSI-RS. The terminal may measure a reception strength of the CSI-RS, and may use the measured reception strength as an intermediate value for deriving the CQI. When a measurement quantity is an angle of arrival (AOA), the terminal and/or the base station has a plurality of Rx branches, and a phase difference between the plurality of Rx branches is detected by reception of the RS, the reception strength of the RS may be used as an intermediate value for deriving the AoA.

When an RS is transmitted/received in two or more carriers, an RS reception/measurement operation may be performed in a part of a band to which the RS is mapped according to an RS measurement scheme or a measurement quantity of the RS. The accuracy of the RS reception/measurement operation in a partial band may be lower than the accuracy of the RS reception/measurement operation in the entire band. In a partial band, the RS reception/measurement operation may not be defined according to a measurement quantity.

The RSRP may be measured utilizing all REs in which the RS is received. The AoA, RSTD, and/or Rx-Tx time difference may be measured utilizing some REs in which the RS is received.

Figure 11:
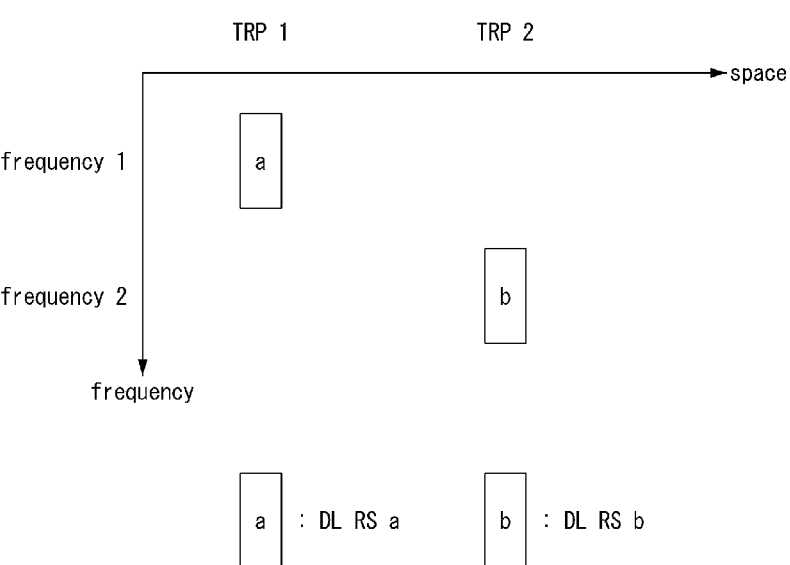
FIG. 11 is a conceptual diagram illustrating a first exemplary embodiment of DL RSs received through different TRPs in different frequencies.

FIG. 11 is a conceptual diagram illustrating a first exemplary embodiment of DL RSs received through different TRPs in different frequencies.

Referring to FIG. 11, a TRP 1 may transmit an RS a (e.g., DL RS a) in a frequency 1, and a TRP 2 may transmit an RS b (e.g., DL RS b) in a frequency 2. The terminal may derive a measurement quantity based on the RS a received from the TRP 1, and may derive a measurement quantity based on the RS b received from the TRP 2. In an RSTD measurement procedure, the terminal may derive a difference between a reception time ta of the RS a and a reception time tb of the RS b.

The difference between the reception time ta of the RS a and the reception time tb of the RS b may be expressed based on a time difference ($\Delta \geq 0$) between the TRP 1 and the TRP 2, a distance ($c/d_1$) between the TRP 1 and the terminal, and a distance ($c/d_2$) between the TRP 2 and the terminal. For example, the RSTD may have a relationship of Equation 6 below.

$$\text{RSTD}+|t_a-t_b|=\Delta+|c/d_1-c/d_2| \qquad \text{[Equation 6]}$$

The terminal and/or the base station may know A in advance. In this case, the terminal and/or the base station may know a relative distance difference between the TRP 1 and the TRP 2 by combining a plurality of RSTDs.

The terminal may receive the RS a and the RS b through one TRP in different frequencies, and may measure RSTDs based on the RS a and the RS b. The one TRP may mean that the TRP 1 is identical to the TRP 2. The terminal may not need to know from which TRP the RS a and the RS b are received.

In addition to the RSTDs, other measurement quantities (e.g., ToA or Rx-Tx time difference) may be measured based on the RS s received in different frequencies. The other measurement quantities may refer to measurement quantities related to timing. The Rx-Tx time difference may be measured by one terminal and one TRP. The RS for measuring the reception time may be different from an RS corresponding to a transmission time. A frequency resource of the RS for measuring the reception time may be different from a frequency resource of the RS corresponding to the transmission time.

Method 2.3-1: RSs received in different frequency bands may be used to measure the RSTD or ToA.

2.3.1 Priority Handling by Dropping

A part of (or the entire) DL RS transmission may be canceled by another DL signal/channel transmission. In other words, the terminal may not be able to receive a part of (or the entire) DL RS due to reception of another DL signal/channel. When the terminal receives another DL signal/channel (e.g., PDSCH, PDCCH, and/or SSB), the DL RS transmission (or DL RS reception) may be canceled in units of symbols or in units of a carrier by reception of another DL signal/channel.

Priorities for an SSB, PDSCH, PDCCH, and DL RS may be determined according to a predefined rule. When DL transmission resources overlap, a DL signal/channel having a higher priority may be received by the terminal. Alternatively, it may be assumed that resources for an SSB, PDSCH, PDCCH, and DL RS do not collide.

Method 2.3-2: It may be assumed that an SSB is not mapped in REs to which a DL RS is mapped. The terminal may assume that a DL RS and an SSB are mapped in different resources.

When a priority of an SSB is higher than a priority of a DL RS, a part of the DL RS may be punctured or dropped. A unit of puncturing or dropping may be an RE or a symbol.

Method 2.3-3: It may be assumed that a DL RS is not mapped in REs to which an SSB is mapped. A unit of puncturing or dropping of the DL RS may be an RE or a symbol.

When a DL RS is punctured, the DL RS may be punctured in REs where a DL RS resource and an SSB resource (e.g., a gap related to an SSB) overlap. A sequence of the DL RS may be first mapped to REs, and the DL RS may be punctured in REs where the DL RS resource and the SSB resource collide with each other.

When a DL RS is dropped, the DL RS may be dropped in REs where a DL RS resource and an SSB resource (e.g., a gap related to an SSB) overlap. A frequency resource for a symbol may include a plurality of PFLs.

Method 2.3-4: In Method 2.2-8, DL RS transmission (or DL RS reception) in all bands may be canceled in units of symbols.

Method 23-5: In Method 2.2-8, DL RS transmission (or DL RS reception) in some carriers may be canceled in units of symbols.

Chapter 3 RS for Coherent Transmission and Reception in the Time Domain 3.1 Sampling Method The terminal may receive a signal from the base station, perform bandpass filtering on the signal, and perform wideband sampling or narrowband sampling on a result of the bandpass filtering.

Figure 12:
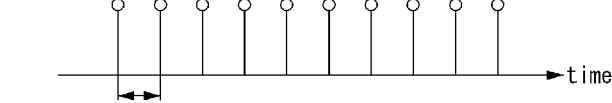
FIG. 12 is a conceptual diagram illustrating a first exemplary embodiment of a sampling method for an RS in the time domain.

FIG. 12 is a conceptual diagram illustrating a first exemplary embodiment of a sampling method for an RS in the time domain.

Referring to FIG. 12, the terminal may receive an RS in two or more carriers, perform wideband sampling on the RS in the time domain, and perform multi-carrier demodulation on a result of the wideband sampling. A period applied to the sampling may be determined based on a bandwidth including a guard band. In other words, a wideband sampling rate may be determined based on a bandwidth of all carriers. The wideband sampling operation may be performed quickly.

FIG. 12 is a conceptual diagram illustrating a first exemplary embodiment of a sampling method for an RS in the time domain.

Figure 13:
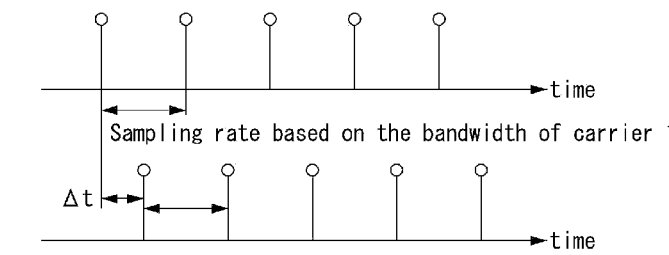
FIG. 13 is a conceptual diagram illustrating a first exemplary embodiment of a sampling method for an RS in the time domain.

Referring to FIG. 13, the terminal may receive an RS in two or more carriers, perform narrowband sampling on the RS in the time domain, and perform multi-carrier demodulation on a result of the narrowband sampling. A period applied to the sampling may be determined based on a bandwidth of each carrier. In other words, a narrowband sampling rate may be determined based on the bandwidth of each carrier. The narrowband sampling rate may be lower than the wideband sampling rate. A sampler supporting a slow sampling operation may be inexpensive, and power consumption of the sampler may be low.

Each sampling may correspond to each carrier. Time synchronization between carriers may not be secured. Accordingly, a time offset Δt may exist between the carriers. The time synchronization of a carrier may be obtained based on an SSB and/or CSI-RS received in the carrier. The CSI-RS may be obtained from a CSI-RS (e.g., TRS) for tracking. In each carrier, each sampler may perform sampling according to the time synchronization.

The base station may transmit a DL RS in a wide band, and the terminal may perform narrowband sampling on the DL RS. In this case, it may be preferable for a sampler in each of the carriers to have the same time offset. For example, Δt may be set to zero. In some cases, performing the above-described operation may be difficult.

The base station may transmit other DL signals/channels as well as the DL RS in a plurality of carriers. The above-described scenario may be a multi-user scenario. In a multi-user scenario, when the base station transmits a wideband DL RS for one terminal, time synchronization may not match in a certain carrier. Even when time offsets do not match between one carrier and another, it may be preferable for the base station to multiplex the wideband DL RS and DL signal(s)/channel(s) for other terminal(s).

The terminal may perform sampling based on different time offsets in the respective carriers. Therefore, in the time domain, the sampler may adjust a timing of the sampling based on the time offset. Alternatively, the time offset may be reflected in a DL RS generation procedure.

When the sampler adjusts a timing of the sampling based on the time offset in the time domain, the timing of the sampling may be instantaneously adjusted using the DL RS. When the timing needs to be greatly changed, a DL RS having a high density may be required, and a lot of time may be required to change the timing of the sampling. The DL RS with a high density may mean that the DL RS is mapped to many REs.

The time offset may be reflected in the DL RS generation procedure, and the timing of the sampling (e.g., sampler timing) may not be changed. Even in this case, the time offset may be derived in the DL RS reception procedure, and an equalization operation may be performed based on the time offset.

Method 3.1-1: The time offset may be reflected in the DL RS generation procedure.

The time offset may be transformed to a phase in the frequency domain. The phase may be reflected in REs or each element of a sequence. An element of a sequence, which is mapped to an RE corresponding to a subcarrier k and a symbol 1, may be referred to as $a_{k,l}$. The phase derived from the time offset $\tau$ may be additionally applied to $a_{k,l}$. A function that transforms the time offset corresponding to the subcarrier k into the phase may be referred to as $f_k(\bullet)$, and the phase may be expressed as $e^{f_k(\tau)}$. According to Method 3.1-1, $a_{k,l}{'}=a_{k,l}\cdot e^{f_k(\tau)}$ may be defined. A precoding operation for MIMO or beamforming may be performed, and magnitude scaling may be performed for power control.

Method 3.1-2: In Method 3.1-1, a time offset may be derived differently for each of the carriers.

A DL RS may be transmitted in two or more carriers. In this case, a time offset for one reference time may be derived differently for each of the two or more carriers. If the reference time is derived based on an SSB of a specific carrier, a time offset for the specific carrier may not need to be derived, and time offsets for the remaining carriers may be derived.

A time offset measured by the base station may be applied. Alternatively, a previously known time offset may be applied. If the base station does not know the time offset, the terminal may measure the time offset, and may feed back information of the measured time offset to the base station. The base station may receive the information of the time offset from the terminal. A configuration or method for the terminal to measure the time offset may be based on the above-described '2.2 RS configuration method' and/or '2.3 DL RS measurement method'.

The terminal may measure a ToA using the DL RS received in each carrier, and may feed back information of the measured ToA to the base station. The DL RS may be at least one of a CSI-RS for CSI measurement, CSI-RS for tracking, CSI-RS for beam management, or SSB. The base station may derive a time offset considering a difference between ToAs, transform the time offset into a phase, and change a phase in a DL RS generation procedure for each carrier.

The terminal may measure an RSTD using DL RSs received in different carriers, and may feed back information of the measured RSTD to the base station. The DL RS may be at least one of a CSI-RS for CSI measurement, CSI-RS for tracking, CSI-RS for beam management, or SSB. The base station may derive a time offset using the RSTD, transform the time offset into a phase, and change a phase in a DL RS generation procedure for each carrier.

The time offset may be measured differently according to a reception strength of the DL RS (e.g., SINR at the terminal). In this case, the base station may apply a transmit power (e.g., power boosting) or precoding of the DL RS so that the time offset is accurately measured by the terminal. In other words, the base station may apply a transmit power (e.g., power boosting) or precoding of the DL RS so that the terminal receives the DL RS with a high SINR.

Alternatively, the terminal may transmit a UL RS. The UL RS may be transmitted in two or more carriers. Alternatively, the UL RS may be transmitted in each carrier. The base station may receive the UL RS. The base station may derive a time offset based on the UL RS in each carrier.

The terminal may transmit a UL RS in two or more carriers. In this case, the terminal may generate UL RS sequences having different phases in the two or more carriers.

The carriers may belong to the same TAG. In this case, the terminal may apply the same TA to the carriers and may apply a time offset of each of the carriers. The base station may receive the UL RS in a wide band. The base station may measure an RSTD or Rx-Tx timing difference based on the UL RS considering that a different time offset is applied to each carrier. The Rx-Tx timing difference may mean an Rx-Tx time difference.

The UL RS may be an SRS. The base station may secure orthogonality of multi-users by using a phase of the SRS. The terminal may transmit SRSs having different phases. In this case, a multiplexing order of multiple users may decrease.

The terminal may transmit UL RSs in different carriers. In other words, the terminal may transmit a UL RS in each carrier. The base station may receive the UL RSs in the different carriers, and may measure an RSTD or Rx-Tx timing difference using the UL RSs. The UL RSs may be received in the different carriers, and the UL RSs may be converted into one metric based on the above-described '2.2 RS configuration method' and/or '2.3 DL RS measurement method'.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
receiving, from a base station, configuration information of uplink reference signal (UL RS) for two or more cells;
receiving serving RS information from the base station;
determining a Tx beam for transmission of a first UL RS and a second UL RS based on the serving RS information;
transmitting the first UL RS using the determined Tx beam to the base station based on the configuration information in a first cell of the two or more cells; and
transmitting the second UL RS using the determined Tx beam to the base station based on the configuration information in a second cell of the two or more cells, wherein when transmission of at least one of the first UL RS or the second UL RS collides with another signal or channel transmission, a part of the transmission of at least one of the first UL RS or the second UL RS is canceled in units of symbols in an entire band.

2. The method according to claim 1, wherein the first UL RS and the second UL RS are transmitted in a same time, and the first UL RS and the second UL RS are mapped at a same interval in a frequency region excluding a guard band.

3. The method according to claim 1, wherein a state of the first cell and a state of the second cell are a same state, and the same state is an activated state or a deactivated state.

4. The method according to claim 1, wherein a first energy per resource element (EPRE) for the first UL RS transmitted in the first cell is identical to a second EPRE for the second UL RS transmitted in the second cell.

5. The method according to claim 1, wherein a maximum number of transmission combs is same in all bandwidth parts (BWPs) belonging to the two or more cells, and the transmission comb is applied to transmission of each of the first UL RS and the second UL RS.

6. The method according to claim 1, further comprising: receiving, from the base station, a power control parameter set, wherein the first UL RS and the second UL RS are transmitted based on the power control parameter set.

7. The method according to claim 6, further comprising:
receiving a pathloss (PL) RS indicated by the power control parameter set;
measuring a path loss based on the PL RS; and
deriving a transmit (Tx) power based on the path loss, wherein the Tx power is used for transmission of the first UL RS and the second UL RS.

8. The method according to claim 6, wherein the Tx power in each of the two or more cells is derived based on the power control parameter set, and the derived Tx power does not exceed both a maximum power of the terminal and a maximum power allowed in each of the two or more cells.

9. The method according to claim 1, further comprising:
receiving one or more downlink (DL) RSs in the two or more cells.

10. A terminal comprising a processor, wherein the processor causes the terminal to perform:
receiving, from a base station, configuration information of uplink reference signal (UL RS) for two or more cells;
receiving serving RS information from the base station;
determining a Tx beam for transmission of a first UL RS and a second UL RS based on the serving RS information;
transmitting the first UL RS using the determined Tx beam to the base station based on the configuration information in a first cell of the two or more cells; and
transmitting the second UL RS using the determined Tx beam to the base station based on the configuration information in a second cell of the two or more cells, wherein the first UL RS and the second UL RS are transmitted in a same time, and
when transmission of at least one of the first UL RS or the second UL RS collides with another signal or channel transmission, a part of the transmission of at least one of the first UL RS or the second UL RS is canceled in units of symbols in an entire band.

11. The terminal according to claim 10, wherein a state of the first cell and a state of the second cell are a same state, and the same state is an activated state or a deactivated state.

12. The terminal according to claim 10, wherein a first energy per resource element (EPRE) for the first UL RS transmitted in the first cell is identical to a second EPRE for the second UL RS transmitted in the second cell.

13. The terminal according to claim 10, wherein a maximum number of transmission combs is same in all bandwidth parts (BWPs) belonging to the two or more cells, and the transmission comb is applied to transmission of each of the first UL RS and the second UL RS.

14. The terminal according to claim 10, wherein the processor further causes the terminal to perform: receiving, from the base station, a power control parameter set, wherein the first UL RS and the second UL RS are transmitted based on the power control parameter set.

15. The terminal according to claim 14, wherein the processor further causes the terminal to perform:
receiving a pathloss (PL) RS indicated by the power control parameter set;
measuring a path loss based on the PL RS; and
deriving a transmit (Tx) power based on the path loss, wherein the Tx power is used for transmission of the first UL RS and the second UL RS.

16. The terminal according to claim 14, wherein the Tx power in each of the two or more cells is derived based on the power control parameter set, and the derived Tx power does not exceed both a maximum power of the terminal and a maximum power allowed in each of the two or more cells.

* * * * *